(12) United States Patent
Oyama

(10) Patent No.: US 12,555,475 B2
(45) Date of Patent: Feb. 17, 2026

(54) VEHICLE TRAVEL CONTROL ASSISTANCE SYSTEM, SERVER APPARATUS, AND VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 218 days.

(21) Appl. No.: 18/549,484

(22) PCT Filed: Nov. 4, 2021

(86) PCT No.: PCT/JP2021/040676
§ 371 (c)(1),
(2) Date: Sep. 7, 2023

(87) PCT Pub. No.: WO2023/079658
PCT Pub. Date: May 11, 2023

(65) Prior Publication Data
US 2024/0321093 A1  Sep. 26, 2024

(51) Int. Cl.
*G08G 1/0967* (2006.01)
*H04W 4/44* (2018.01)

(52) U.S. Cl.
CPC . *G08G 1/096725* (2013.01); *G08G 1/096775* (2013.01); *G08G 1/096783* (2013.01); *H04W 4/44* (2018.02)

(58) Field of Classification Search
CPC ....... G08G 1/096725; G08G 1/096775; G08G 1/096783; H04W 4/44
See application file for complete search history.

(56) References Cited

U.S. PATENT DOCUMENTS

2018/0218639 A1    8/2018   Ryuzaki et al.
2019/0064833 A1*   2/2019   Nance ............... B60W 30/0953
(Continued)

FOREIGN PATENT DOCUMENTS

JP    2003-36495 A      2/2003
JP    2018077845 A  *   5/2018   ....... G08G 1/096775
(Continued)

OTHER PUBLICATIONS

Translation of JP-2021111343-A, 41 pages (Year: 2021).*
(Continued)

*Primary Examiner* — Dale W Hilgendorf
(74) *Attorney, Agent, or Firm* — Rimon P.C.

(57) ABSTRACT

In a travel control assistance system in which server apparatuses assist in a travel control of automobiles, the automobiles each includes a travel controller and a vehicle communication unit. The travel controller carries out the travel control based on detection data by a vehicle sensor. The vehicle communication unit acquires data regarding the travel control from the server apparatus. The server apparatuses as an entirety include individual assistance units corresponding to the respective automobiles, and a high-order assistance unit. The high-order assistance unit collects data regarding the automobiles from the individual assistance units, and generates high-order assistance data for the travel control. The high-order assistance unit offers the generated data to the individual assistance units. The individual assistance units each generates data for the travel control of the corresponding automobile based on the data and the high-order assistance data, and transmits the generated data to the vehicle communication unit.

11 Claims, 11 Drawing Sheets

(56) References Cited

U.S. PATENT DOCUMENTS

| | | | |
|---|---|---|---|
| 2019/0187723 A1 | 6/2019 | Tao et al. | |
| 2020/0004269 A1* | 1/2020 | Oba | B60W 30/165 |
| 2020/0017108 A1* | 1/2020 | Bae | G08G 1/096708 |
| 2021/0155269 A1* | 5/2021 | Oba | G08G 1/096775 |
| 2021/0280057 A1* | 9/2021 | Uçar | G08G 1/096741 |
| 2022/0026212 A1* | 1/2022 | Toutov | G01C 21/3841 |
| 2022/0179409 A1* | 6/2022 | Bhagat | G05D 1/0038 |
| 2023/0356755 A1* | 11/2023 | Tang | B60W 50/14 |
| 2024/0071223 A1* | 2/2024 | Oyama | B60W 30/09 |
| 2024/0377223 A1* | 11/2024 | Mizoguchi | G01C 21/3848 |

FOREIGN PATENT DOCUMENTS

| | | | | |
|---|---|---|---|---|
| JP | 2018-124791 A | | 8/2018 | |
| JP | 2019-27904 A | | 2/2019 | |
| JP | 2019-145077 A | | 8/2019 | |
| JP | 2019-185232 A | | 10/2019 | |
| JP | 2021111343 A | * | 8/2021 | G08G 1/164 |

OTHER PUBLICATIONS

Translation of JP-2018077845-A, 7 pages (Year: 2018).*
International Search Report issued in corresponding International Patent Application No. PCT/JP2021/040676 dated Dec. 14, 2021, with English translation.

* cited by examiner

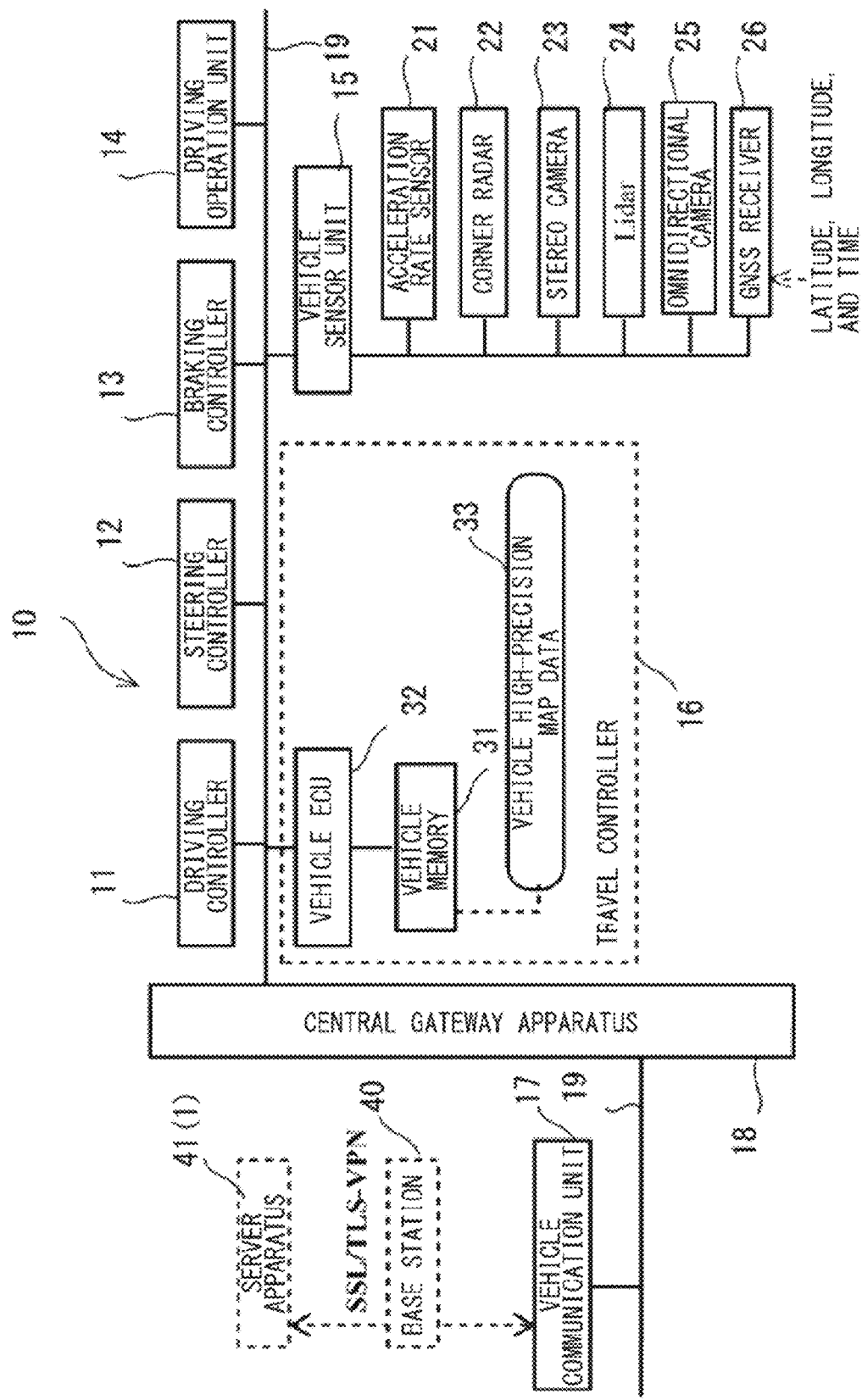
[FIG. 1]

[ FIG. 2 ]
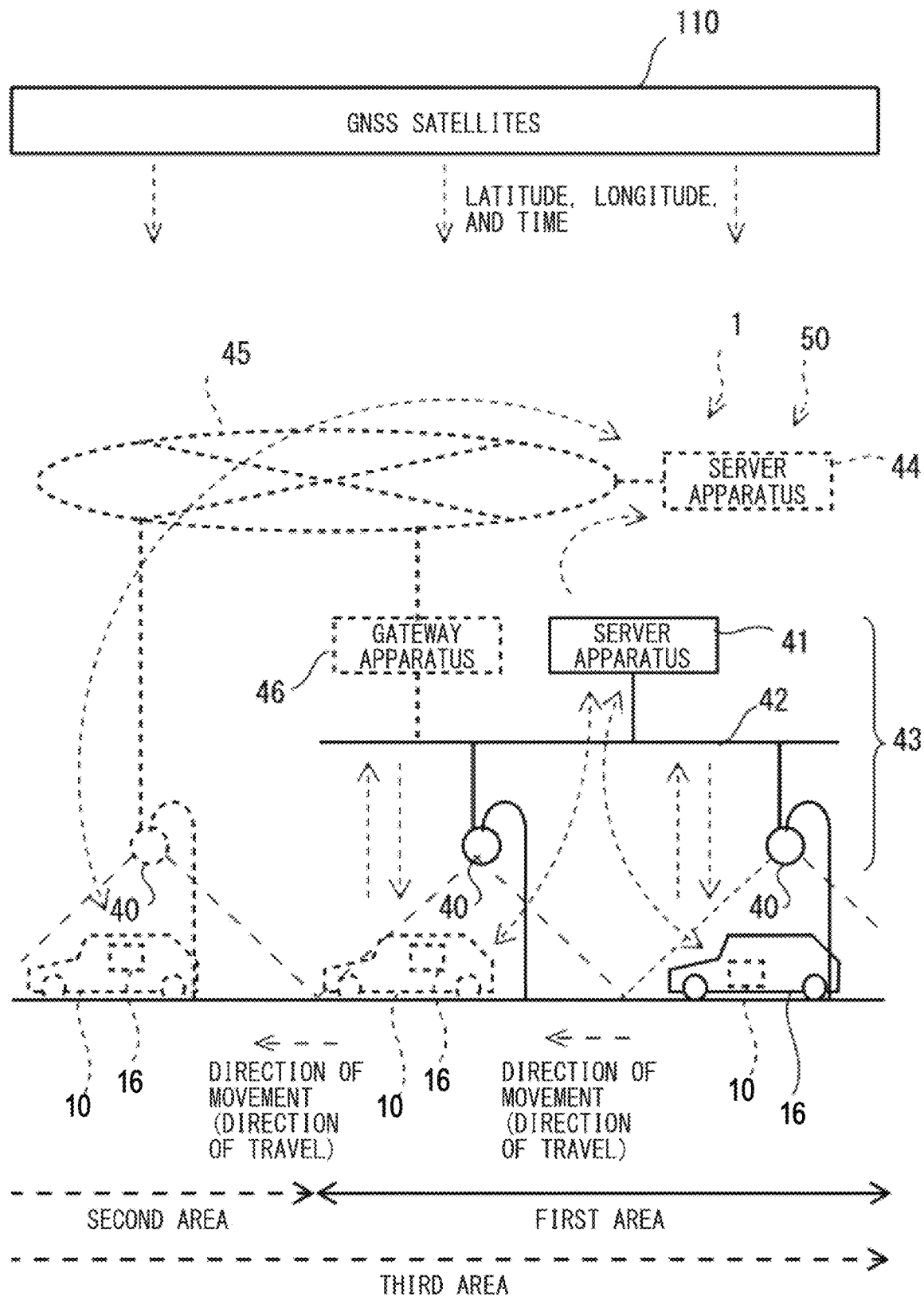

[FIG. 3]
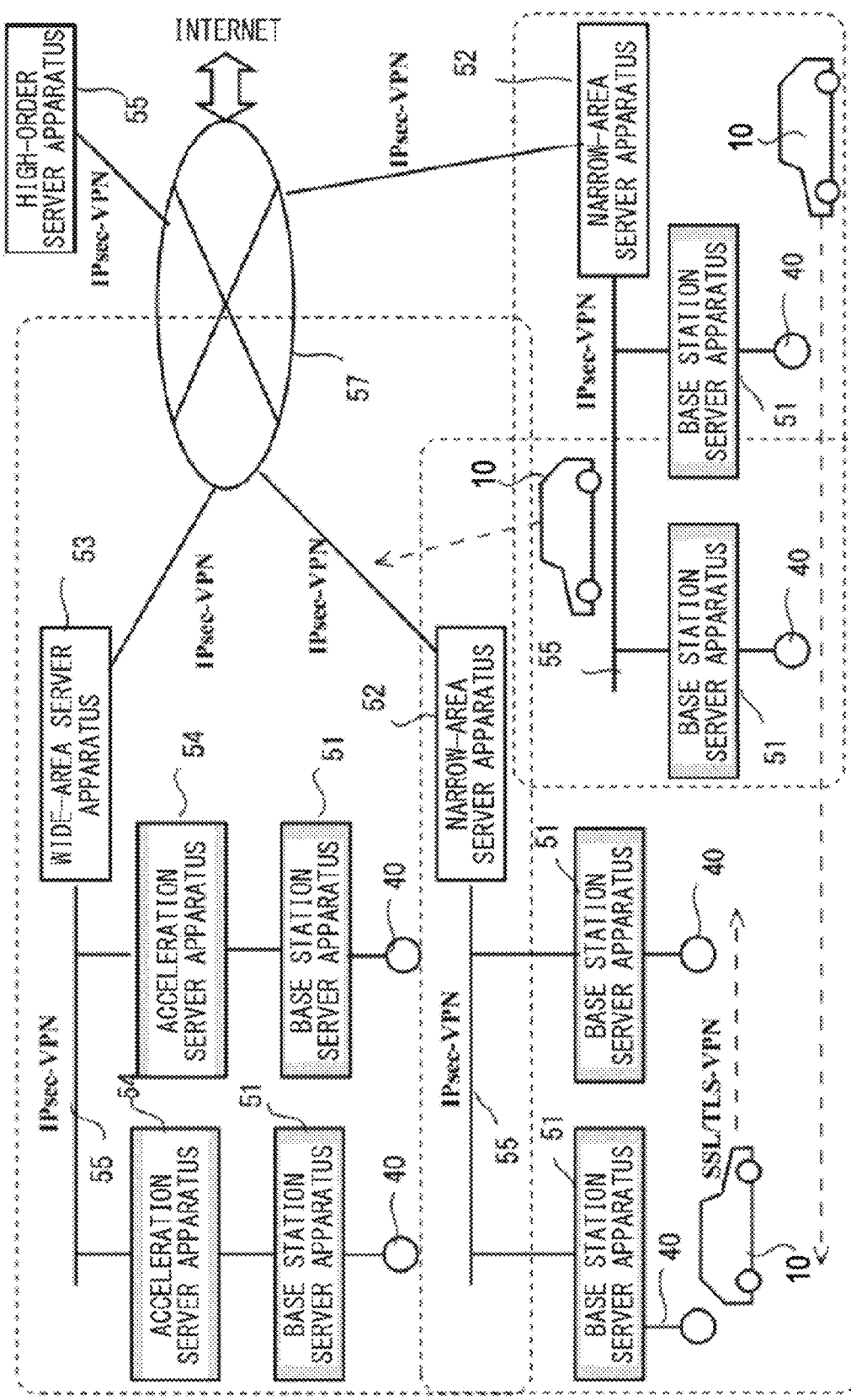

[FIG. 4]
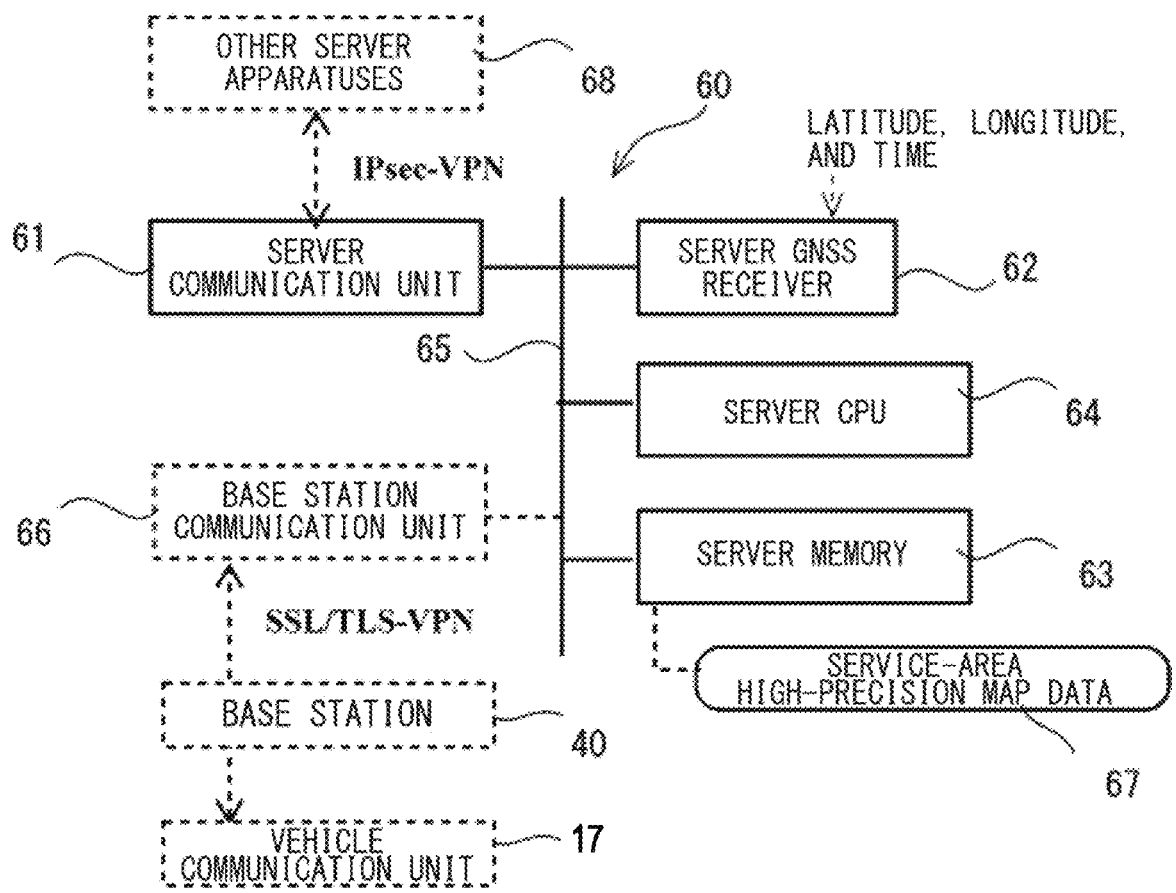

[ FIG. 5 ]
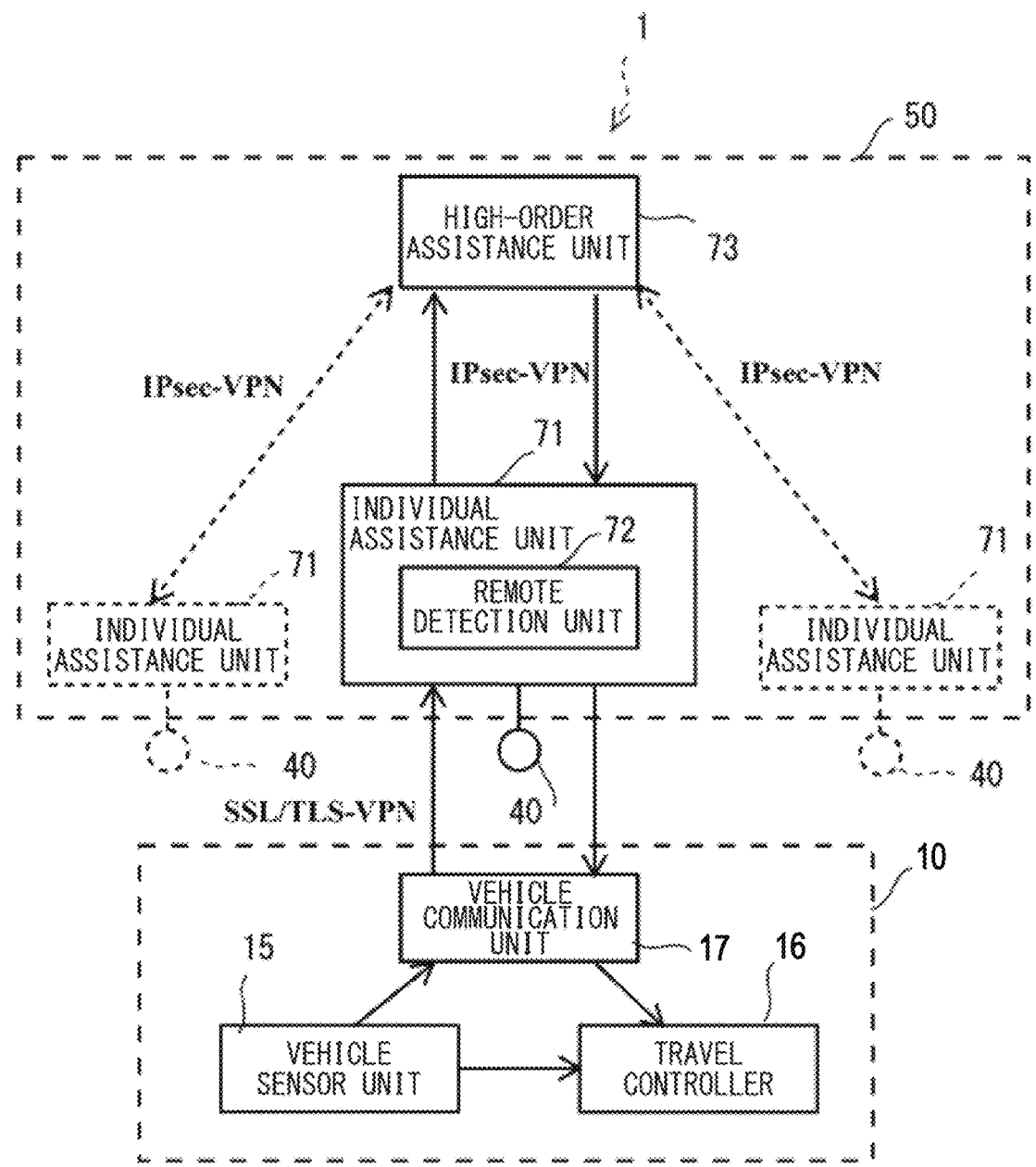

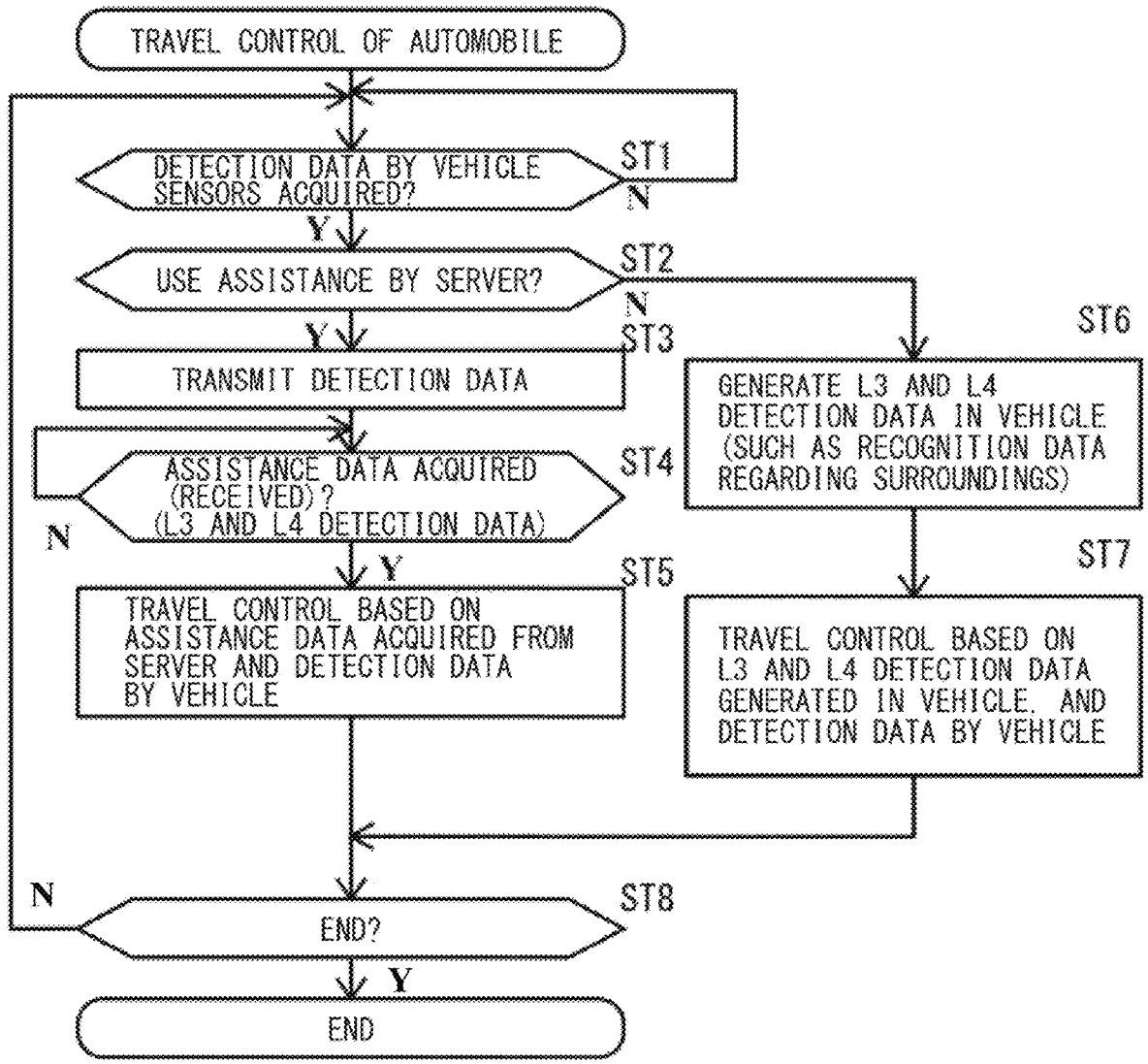

[ FIG. 7 ]
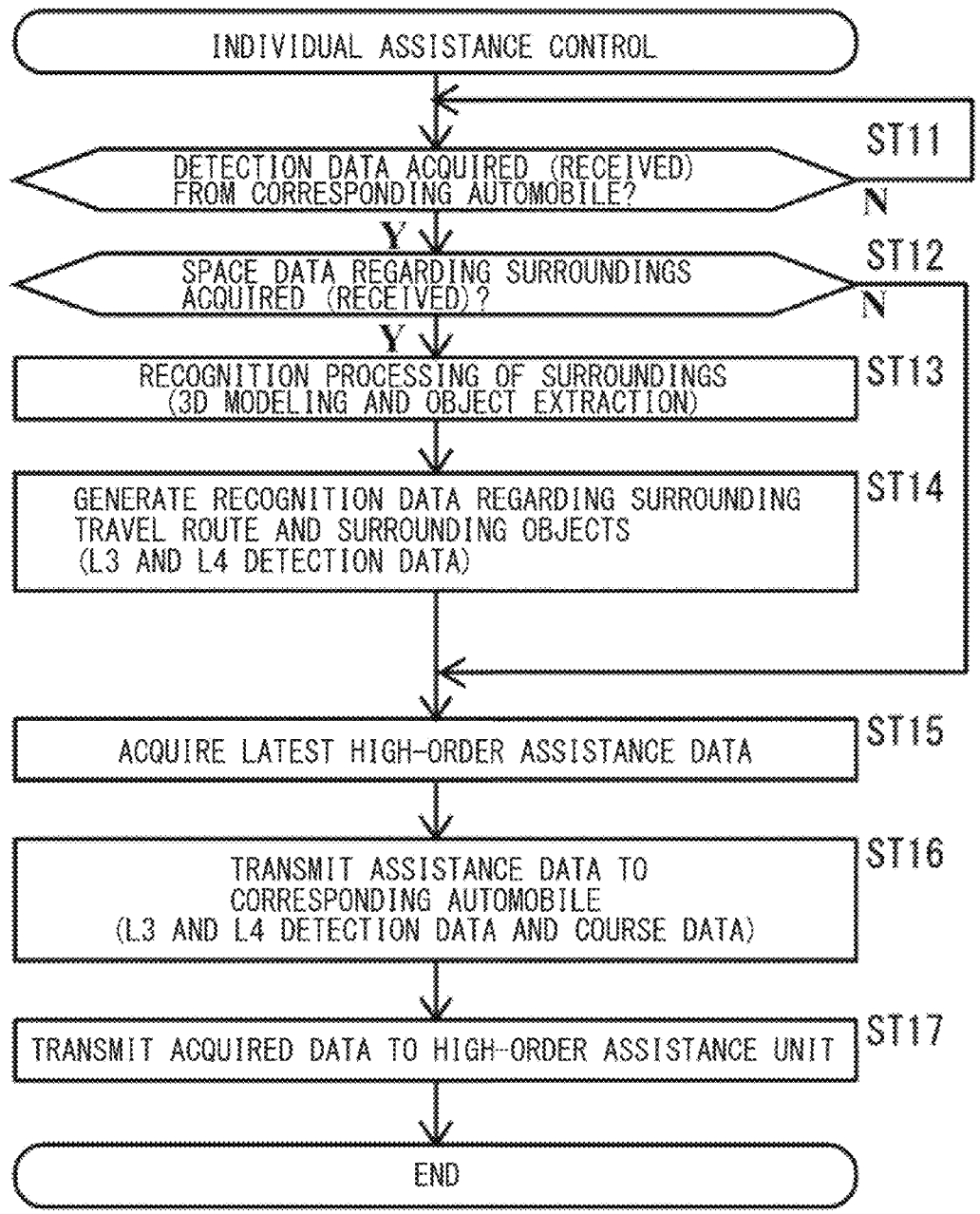

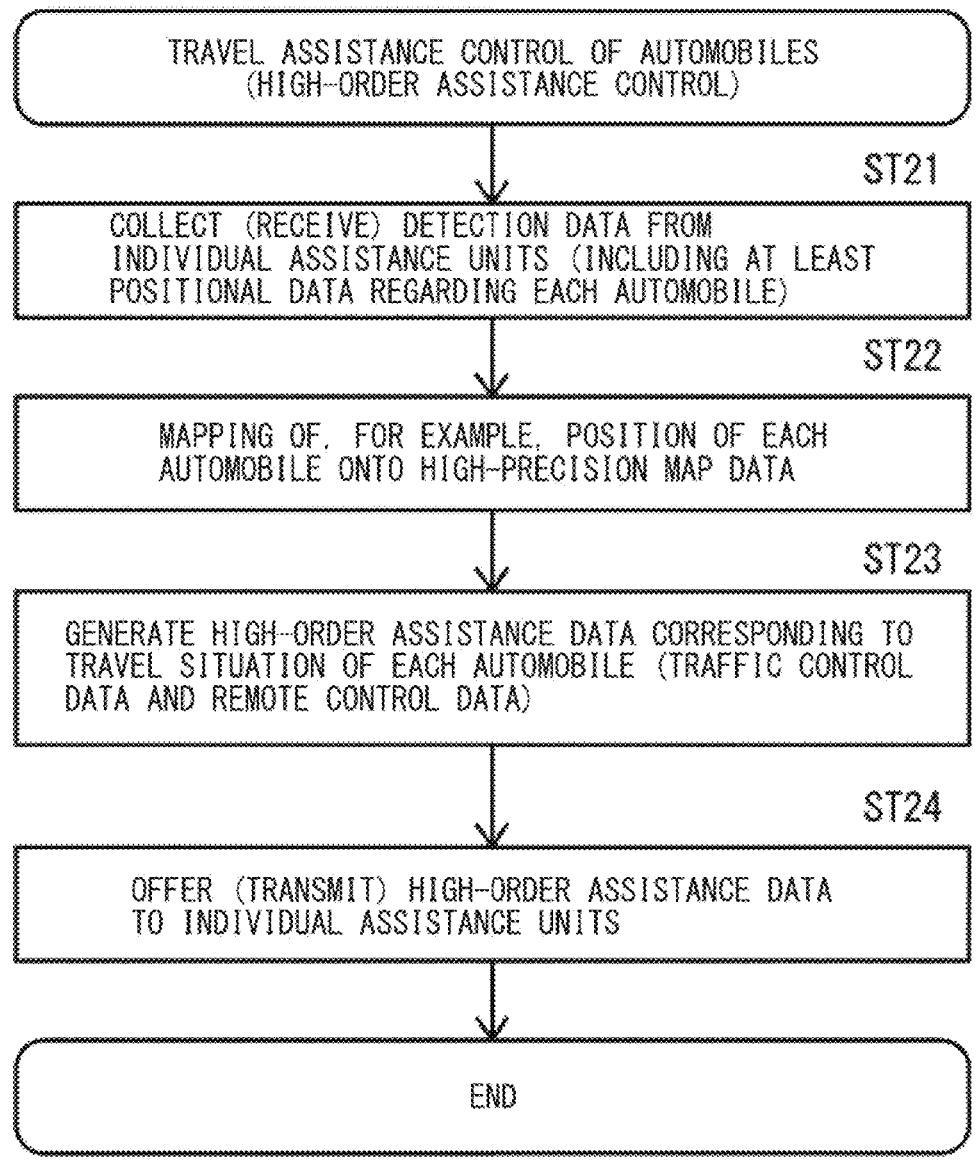

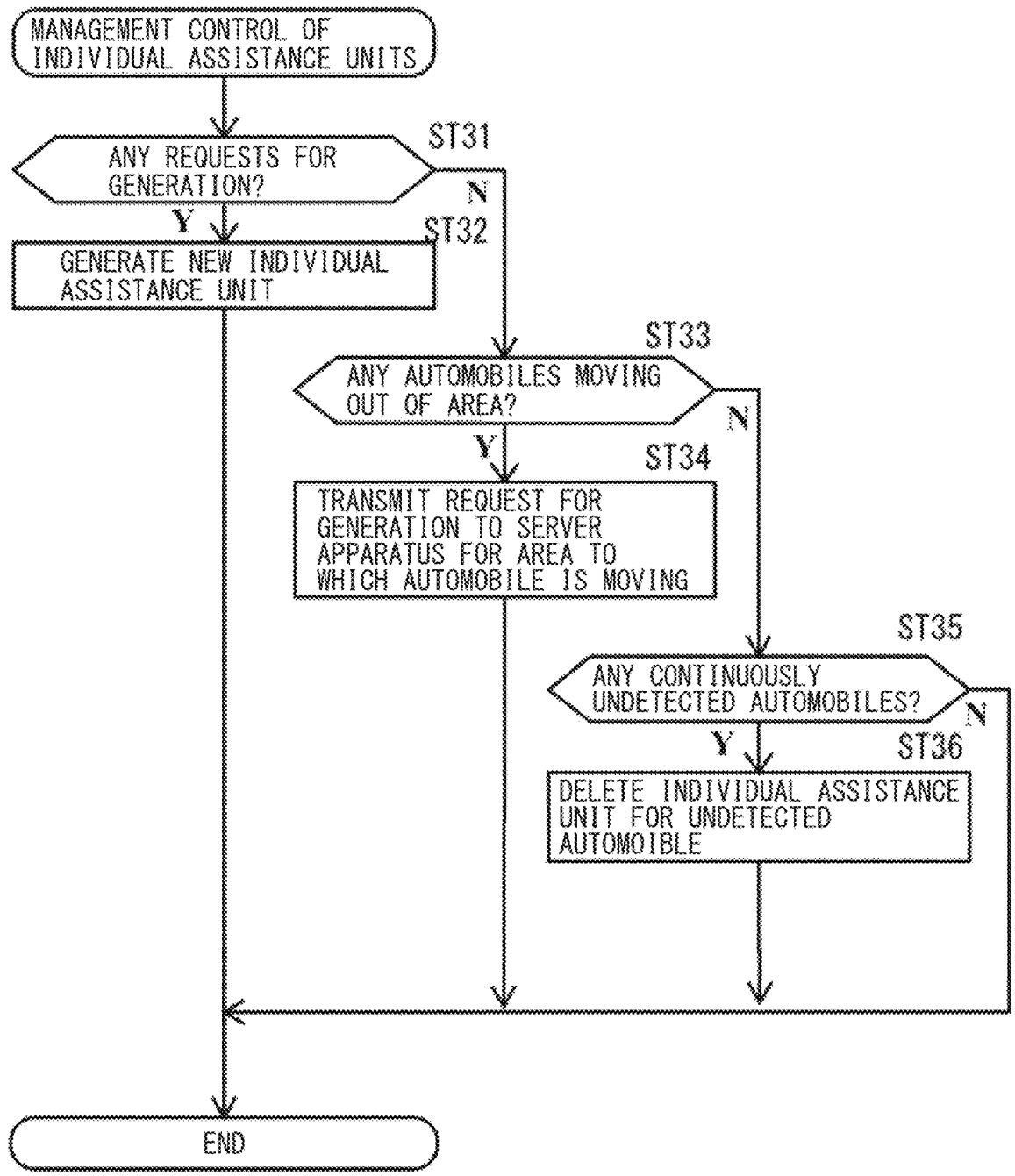

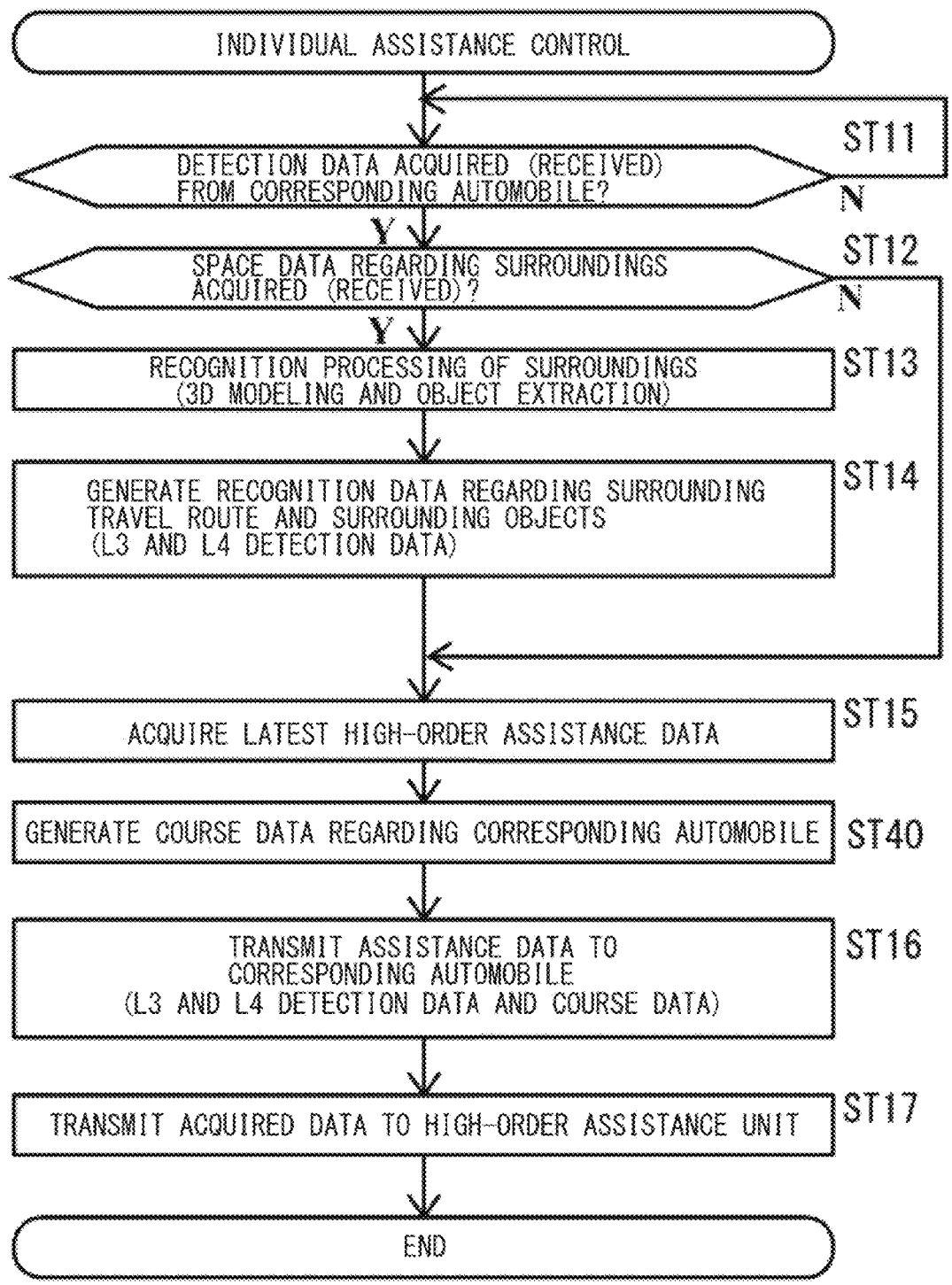

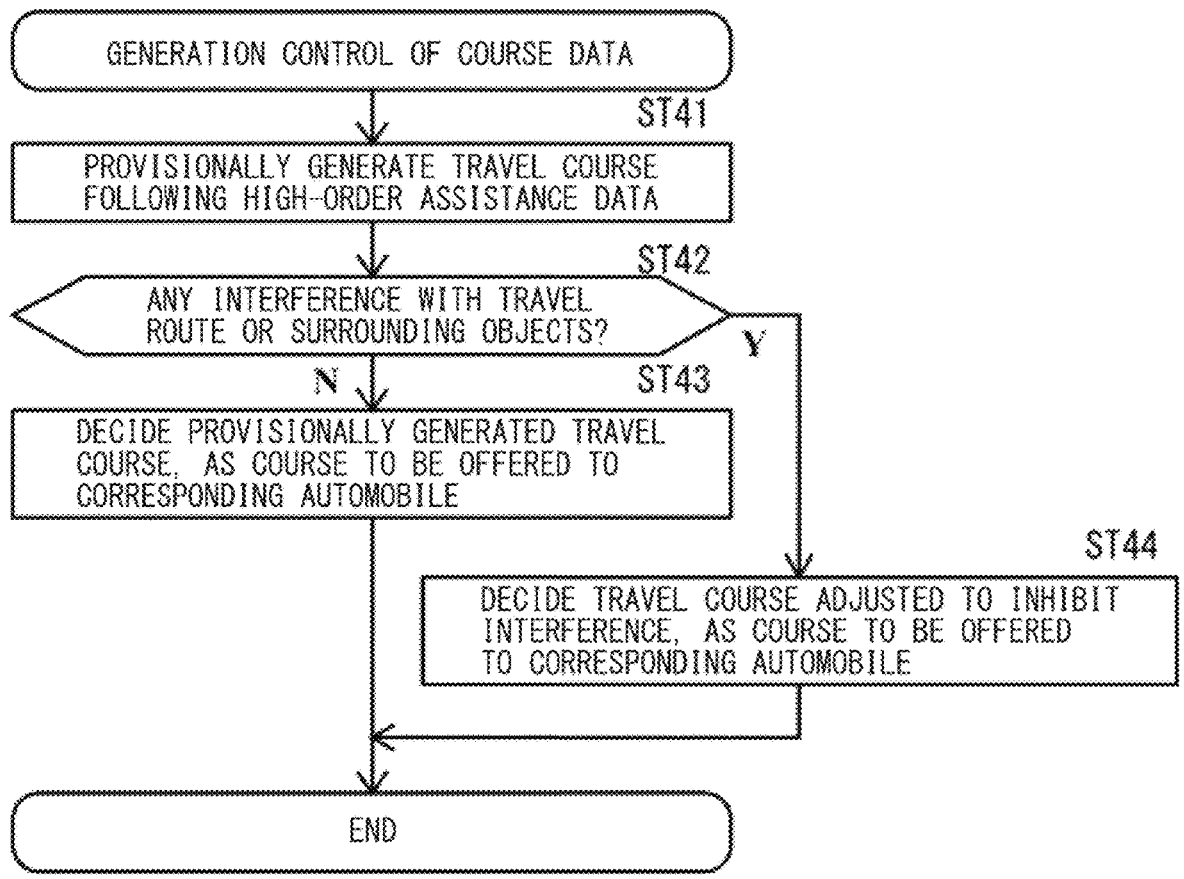

VEHICLE TRAVEL CONTROL ASSISTANCE SYSTEM, SERVER APPARATUS, AND VEHICLE

CROSS REFERENCE TO RELATED APPLICATIONS

This application is the U.S. National Phase under 35 U.S.C. § 371 of International Application No. PCT/JP2021/040676, filed on Nov. 4, 2021, and the entire contents of each are hereby incorporated by reference.

TECHNICAL FIELD

The invention relates to a vehicle travel control assistance system, a server apparatus, and a vehicle.

BACKGROUND ART

In vehicles such as automobiles, developments aimed at automated driving have been in progress.

Moreover, automated driving of automobiles is classified into, for example, the level 1 to the level 5.

According to the Ministry of Land, Infrastructure, Transport and Tourism of Japan, the automated driving of the level 1 refers to carrying out driver assistance in one of, for example, automatic braking, preceding vehicle following, and lane keeping under monitoring by the driver.

The automated driving of the level 2 refers to carrying out driver assistance, under a specific condition, in a combination of two or more of, for example, automatic braking, preceding vehicle following, and lane keeping under monitoring by the driver. Alternatively, the automated driving of the level 2 refers to carrying out driving assistance under a specific condition such as automatic overtaking on an expressway or diverging and merging on an expressway, under monitoring by the driver.

The automated driving of the level 3 is intended for a continuous travel control of an automobile under monitoring by a control system of the automobile in which the control system requests the driver to intervene based on its monitoring determination. In this case, when there is an intervention request from the control system of the automobile, the driver is requested to promptly respond to the request with responsibility. As the automated driving of the level 3, for example, automated driving on an expressway may be assumed.

The automated driving of the level 4 is intended for a continuous travel control of the automobile under monitoring by the control system of the automobile in which the control system is able to carry out a complete travel control under a specific condition without requesting the driver to intervene. In this case, the driver is not requested to intervene by the control system of the automobile under the specific condition. If not under the specific condition, there is possibility that the driver may receive the intervention request from the control system of the automobile, and the driver is requested to promptly respond to the request with responsibility. As the automated driving of the level 4, for example, an unmanned automated driving transportation service in a limited area, or a fully automated driving on an expressway may be assumed.

The automated driving of the level 5 refers to completely carrying out all travel controls constantly under monitoring by the control system of the automobile. In this case, the driver does not receive the intervention request from the control system of the automobile while the automobile is traveling.

As described, a control system of a vehicle such as an automobile is requested to carry out a more complicated and more advanced control as it attempts to cope with the automated driving of the higher levels.

Moreover, to put the advanced automated driving into practical use in the vehicle, it is necessary to provide the vehicle with numerous autonomous sensors, to obtain data necessary for the advanced automated driving.

For example, in carrying out the travel control of the higher levels such as the level 3 and the level 4, it is necessary for the control system of the vehicle to include, for example, Lidar and an omnidirectional camera that detect the surroundings of the vehicle, and generate recognition data regarding a travel route around the vehicle and various surrounding objects based on space data regarding the surroundings detected by the Lidar and the omnidirectional camera. In addition, the control system of the vehicle has to carry out the travel control based on the recognition data, to maintain the travel along the lane while, for example, avoiding an obstacle. This means a significant increase in a processing load on the vehicle, as compared to a case where the travel control of the lower level such as the level 1 and the level 2 can be carried out by, for example, a lane keeping control based on pattern recognition of lanes based on captured images at short distances or an adaptive cruise control (preceding vehicle following control) based on pattern recognition of a preceding vehicle based on the captured images at short distances.

Moreover, vehicles are intended to move, and it is necessary to operate the numerous autonomous sensors while traveling basically in a parasitic state, generate detection data based on detection values by the numerous autonomous sensors, and carry out the travel control based on the detection data. As vehicles are adapted for the automated driving of the higher levels, the performance desired for vehicles such as automobiles becomes significantly higher.

CITATION LIST

Patent Literature

Patent Literature 1: Japanese Unexamined Patent Application Publication No. 2019-027904
Patent Literature 2: Japanese Unexamined Patent Application Publication No. 2019-185232
Patent Literature 3: Japanese Unexamined Patent Application Publication No. 2019-145077

SUMMARY OF INVENTION

Problem to be Solved by the Invention

Thus, in the automated driving of vehicles such as automobiles, it is conceivable to reduce the burden on the vehicle that carries out the travel control of the high level, with the use of a server apparatus configured to communicate with the vehicle through a base station (Patent Literatures 1 and 2). Moreover, as in Patent Literature 3, it is also conceivable to allow a server apparatus to sort out traffic data and offer the traffic data to the vehicle. The server apparatus is configured to communicate with the vehicle through a base station.

However, when the server apparatus is allowed to assist in the travel control of the vehicle, it is necessary to take time to transmit and receive data between the vehicle and the server apparatus, as compared with a case where data is processed in the vehicle itself. There is possibility that delay time caused by, for example, communication may cause a control delay.

In particular, vehicles such as automobiles are intended to move. Accordingly, a communication path between the vehicle and the server apparatus includes wireless communication through a base station. In addition, when the vehicle moves, the base stations to be used by the vehicle for the wireless communication must be switched. In such environment, to allow the server apparatus to assist in the travel of the vehicle, it is desirable to realize a small delay by suppressing the control delay caused by communication, and allow for stabilization of an amount of delay caused by the small delay to prevent excessive fluctuation of the amount of delay even when the base stations are switched.

As described, in the travel control of vehicles, it is desired to solve the problems as mentioned above while keeping overall balance, making it possible to realize assistance by a server apparatus in the travel control of vehicles.

Means for Solving the Problem

A vehicle travel control assistance system according to an aspect of the invention is a vehicle travel control assistance system in which vehicles and server apparatuses establish wireless communication through base stations to allow the server apparatuses to assist in a travel control of the vehicles. Each of the vehicles includes a travel controller and a vehicle communication unit. The travel controller is configured to carry out the travel control based on detection data by a vehicle sensor provided in each of the vehicles. The vehicle communication unit is configured to acquire data to be used in the travel control by the travel controller, from the server apparatuses by the wireless communication through the base stations. Each of the server apparatuses includes at least one of: individual assistance units; a high-order collection unit; a high-order assistance unit; and a high-order offering unit. The individual assistance units are to be created in corresponding relation to the respective vehicles. Each of the individual assistance units are configured to offer data available to the travel controller of a corresponding one of the vehicles for the travel control, to the vehicle communication unit by the wireless communication through the base stations, to assist in the travel control of the corresponding one of the vehicles. The high-order collection unit is configured to collect data regarding the vehicles to which the respective individual assistance units correspond, from the respective individual assistance units. The high-order assistance unit is configured to generate high-order assistance data for the travel control of each of the vehicles based on travel states of the vehicles, with the use of the data regarding the vehicles collected by the high-order collection unit. The high-order offering unit is configured to offer the high-order assistance data generated to be offered to each of the vehicles by the high-order assistance unit, to the individual assistance units created in the corresponding relation to the respective vehicles. The server apparatuses as an entirety include the individual assistance units, the high-order collection unit, the high-order assistance unit, and the high-order offering unit. Each of the individual assistance units to be created in the corresponding relation to the respective vehicles is configured to generate the data available to the travel controller of the corresponding one of the vehicles for the travel control, based on the data acquired from the corresponding one of the vehicles and the high-order assistance data offered by the high-order offering unit, and transmits the generated data to the vehicle communication unit of the corresponding one of the vehicles.

A server apparatus according to an aspect of the invention is a server apparatus to be used in a vehicle travel control assistance system in which vehicles and server apparatuses establish wireless communication through base stations to allow the server apparatuses to assist in a travel control of the vehicles. The server apparatus includes a server communication unit and a server controller. The server communication unit is configured to establish communication with one of the server apparatuses other than the server apparatus by wired coupling without the wireless communication through the base stations. The server controller is configured to carry out a control of allowing the server apparatuses to assist in the travel control of the vehicles. The server controller is configured to carry out a control with respect to at least one of individual assistance units or at least a high-order assistance unit out of: the individual assistance units; a high-order collection unit; a high-order assistance unit; and a high-order offering unit. The individual assistance units are to be created in corresponding relation to the respective vehicles. Each of the individual assistance units is configured to offer data available to the travel controller of a corresponding one of the vehicles for the travel control, to the vehicle communication unit by the wireless communication through the base stations, to assist in the travel control of the corresponding one of the vehicles. The high-order collection unit is configured to collect data regarding the vehicles to which the respective individual assistance units correspond, from the respective individual assistance units. The high-order assistance unit is configured to generate high-order assistance data for the travel control of each of the vehicles based on travel states of the vehicles, with the use of the data regarding the vehicles collected by the high-order collection unit. The high-order offering unit is configured to offer the high-order assistance data generated to be offered to each of the vehicles by the high-order assistance unit, to the individual assistance units created in the corresponding relation to the respective vehicles.

A vehicle according to an aspect of the invention includes a vehicle configured to be assisted in a travel control of the vehicle by server apparatuses, with vehicles including the vehicle and the server apparatuses of a travel control assistance system establishing wireless communication through base stations. The vehicle includes: a vehicle sensor; a travel controller; and a vehicle communication unit. The travel controller is configured to carry out the travel control based on detection data by the vehicle sensor. The vehicle communication unit is configured to acquire data to be used in the travel control by the travel controller, from the server apparatus by the wireless communication through the base stations. The vehicle communication unit is configured to transmit the detection data by the vehicle sensor, to the server apparatus in which an individual assistance unit corresponding to the vehicle is created, and receive secondary detection data generated by the individual assistance unit by processing the detection data by the vehicle sensor, from the server apparatus in which the individual assistance unit corresponding to the vehicle comes up. The travel controller is configured to carry out the travel control with the use of the secondary detection data received by the vehicle communication unit, and the detection data by the vehicle sensor.

Effects of the Invention

In the invention, to assist in the travel control of the vehicles, the server apparatuses are used. Moreover, each of the vehicles includes the travel controller and the vehicle communication unit. The travel controller is configured to carry out the travel control based on the detection data by the vehicle sensor provided in each of the vehicles. The vehicle communication unit acquires the data to be used in the travel control by the travel controller, from the server apparatuses by the wireless communication through the base stations.

Moreover, in the invention, each of the server apparatuses includes at least one of: the individual assistance units; the high-order collection unit; the high-order assistance unit; and the high-order offering unit. The individual assistance units are to be created in the corresponding relation to the respective vehicles. The individual assistance units each offer the data available to the travel controller of the corresponding one of the vehicles for the travel control, to the vehicle communication unit by the wireless communication through the base stations, to assist in the travel control of the corresponding one of the vehicles. The high-order collection unit collects the data regarding the vehicles to which the respective individual assistance units correspond, from the respective individual assistance units. The high-order assistance unit generates the high-order assistance data for the travel control of each of the vehicles based on the travel states of the vehicles, with the use of the data regarding the vehicles collected by the high-order collection unit. The high-order offering unit offers the high-order assistance data to the individual assistance units created in the corresponding relation to the respective vehicles. The high-order assistance data is generated to be offered to each of the vehicles by the high-order assistance unit. Moreover, the server apparatuses as the entirety include all of the individual assistance units, the high-order collection unit, the high-order assistance unit, and the high-order offering unit as mentioned above.

Thus, in the invention, the individual assistance units corresponding to the vehicles come up in the server apparatuses. Each of the individual assistance units generates the data available to the travel controller of the corresponding one of the vehicles for the travel control, based on the data acquired from the corresponding one of the vehicles and the high-order assistance data offered by the high-order offering unit, and transmits the generated data to the vehicle communication unit of the corresponding one of the vehicles by the wireless communication through the base stations. Thus, it is possible for the high-order collection unit, the high-order assistance unit, and the high-order offering unit to offer the high-order assistance data to the vehicles, by offering the high-order assistance data to the individual assistance units in the ranges of the server apparatuses. The high-order assistance data is generated to be offered to each of the vehicles. The high-order collection unit, the high-order assistance unit, and the high-order offering unit are able to carry out stable, small-delay processing, without directly offering the high-order assistance data to the vehicles by the wireless communication through the base stations. Even when the vehicle moves, causing the switching of the base stations to be used in the wireless communication, it is possible to prevent the series of the processing in the server apparatuses from being subjected to influences of the switching as it is, and to carry out the stable, small-delay processing. It is possible to inhibit an excessive delay that causes a delay in the control of the vehicle.

Moreover, the vehicles according to the invention are able to receive the data available to the travel controller of the vehicle for the travel control, from the individual assistance units created in the server apparatuses in the corresponding relation to the respective vehicles, and use the data in the travel control of the vehicle. Without carrying out on its own the processing by, for example, the individual assistance units and the high-order offering unit as mentioned above, the travel controller of each of the vehicles is able to acquire the processing result by reception and use the processing result in the travel control of the vehicle. It is possible to reduce the processing load on each of the vehicles. Even in carrying out the travel control adapted for the automated driving of the high level, each of the vehicles is able to acquire the assistance data from the server apparatuses, and carry out the travel control by small-load processing. It is possible to suppress the performance desired for vehicles such as automobiles.

As described, in the invention, it is possible to solve the problems in allowing the server apparatuses to assist in the travel control of the vehicles, while keeping the overall balance, making it possible to allow the server apparatuses to assist in the travel control of the vehicles.

BRIEF DESCRIPTION OF DRAWINGS

FIG. 1 is a configuration diagram of a control system for an automobile in a first embodiment of the invention.

FIG. 2 is an explanatory diagram of an example of a travel control assistance system configured to be used for assistance in travel of the automobile in FIG. 1.

FIG. 3 is a configuration diagram of the travel control assistance system for the automobile according to the first embodiment of the invention.

FIG. 4 is an explanatory diagram of a hardware configuration of a server apparatus to be used as various server apparatuses in FIG. 3.

FIG. 5 is an explanatory diagram of various functions to be realized to assist in the travel control of automobiles, in the server apparatuses of the travel control assistance system in FIG. 3.

FIG. 6 is a flowchart of a travel control of an automobile configured to receive travel assistance by the travel control assistance system in FIG. 3.

FIG. 7 is a flowchart of an individual assistance control for a corresponding automobile, by an individual assistance unit in FIG. 5.

FIG. 8 is a flowchart of a travel assistance control of the automobiles (high-order assistance control), by a high-order assistance unit in FIG. 5.

FIG. 9 is a flowchart of an example of a management control of the individual assistance units corresponding to the automobiles, in a base station server apparatus including the individual assistance units in FIG. 5.

FIG. 10 is a flowchart of an individual assistance control for a corresponding automobile, by an individual assistance unit in a second embodiment of the invention.

FIG. 11 is a detailed flowchart of generation processing of course data in FIG. 7.

MODES FOR CARRYING OUT THE INVENTION

In the following, some embodiments of the invention are described with reference to the drawings.

First Embodiment

FIG. 1 is a configuration diagram of a control system for an automobile 10 in a first embodiment of the invention.

The automobile 10 in FIG. 1 is an example of a vehicle. Other examples of the vehicle include a motorcycle, a cart, a personal mobility, and a vehicle that travels on a track.

In the automobile 10, developments aimed at automated driving have been in progress. The Ministry of Land, Infrastructure, Transport and Tourism of Japan classifies the automated driving of the automobile 10 into the level 1 for basic driver assistance to the level 5 for highly autonomous fully automated driving.

The automated driving of the level 1 (L1) refers to carrying out driver assistance in one of, for example, automatic braking, preceding vehicle following, and lane keeping under monitoring by the driver.

The automated driving of the level 2 (L2) refers to carrying out driver assistance, under a specific condition, in a combination of two or more of, for example, automatic braking, preceding vehicle following, and lane keeping under monitoring by the driver. Alternatively, the automated driving of the level 2 refers to carrying out driving assistance under a specific condition such as automatic overtaking on an expressway or diverging and merging on an expressway, under monitoring by the driver.

The automated driving of the level 3 (L3) is intended for a continuous travel control of the automobile 10 under monitoring by the control system of the automobile 10 in which the control system requests the driver to intervene based on its monitoring determination. In this case, when there is an intervention request from the control system of the automobile 10, the driver is requested to promptly respond to the request with responsibility. As the automated driving of the level 3, for example, automated driving on an expressway may be assumed.

The automated driving of the level 4 (L4) is intended for a continuous travel control of the automobile 10 under monitoring by the control system of the automobile 10 in which the control system is able to carry out a complete travel control under a specific condition without requesting the driver to intervene. In this case, the driver is not requested to intervene by the control system of the automobile 10 under the specific condition. If not under the specific condition, there is possibility that the driver may receive the intervention request from the control system of the automobile 10, and the driver is requested to promptly respond to the request with responsibility. As the automated driving of the level 4, for example, an unmanned automated driving transportation service in a limited area, or a fully automated driving on an expressway may be assumed.

The automated driving of the level 5 (L5) refers to completely carrying out all travel controls constantly under monitoring by the control system of the automobile 10. In this case, the driver does not receive the intervention request from the control system of the automobile 10 while the automobile 10 is traveling.

The control system of the automobile 10 in FIG. 1 includes a driving controller 11, a steering controller 12, a braking controller 13, a driving operation unit 14, a vehicle sensor unit 15, a travel controller 16, a vehicle communication unit 17, and a central gateway apparatus 18 to which these are coupled with the use of cables 19. The control system of the automobile 10 may include other unillustrated controllers.

The central gateway apparatus 18 and the cables 19 constitute a vehicle network of the automobile 10. The vehicle network is compliant with, for example, the CAN (Controller Area Network) standard or the LIN (Local Interconnect Network) standard. In addition, the vehicle network may be compliant with, for example, the LAN (Local Area Network) standard or the wireless communication standard. To the controllers coupled to the vehicle network, respective IDs as identification data different from one another are assigned. Each of the controllers coupled to the vehicle network basically periodically outputs packetized data to another of the controllers. To the packet, ID (identification) data regarding the controller as a source of the output, and ID data regarding the controller as a destination of the output are added. Each of the other controllers monitors the cable 19 to which it is coupled. When the ID data as the destination of the output of the packet on the cable 19 includes its own ID data or predetermined broadcast ID data, the relevant one of the other controllers acquires the data in the packet, and carries out processing based on the data. Moreover, the central gateway apparatus 18 monitors the cables 19 to which it is coupled. When the controller as the destination of the output is coupled to the cable 19 different from the cable 19 to which the controller as the source of the output is coupled, the central gateway apparatus 18 carries out a routing control to the cable 19 to which the controller as the destination of the output is coupled. With such relay processing by the central gateway apparatus 18, each of the controllers is able to carry out packet-based data input and output with the other controllers coupled to the different cable 19.

The vehicle communication unit 17 is a communication unit to communicate with outside the automobile 10. On a road or in an area where the automobile 10 travels, a carrier communication network for mobile terminals is often provided. Other examples of the base station 40 with which the automobile 10 is configured to communicate include the base station 40 of an intelligent transportation system provided along a road such as an expressway. The vehicle communication unit 17 may establish a communication path by performing wireless communication with these base stations 40, and perform bidirectional communication with, for example, a server apparatus 41 with the use of the communication path and the base stations 40. Upon acquiring data from the vehicle network, the vehicle communication unit 17 transmits a packet including the acquired data to the base station 40 or the server apparatus 41 with the use of the established communication path. Upon acquiring data from the vehicle network, the vehicle communication unit 17 receives a packet from the base station 40 or the server apparatus 41 through the established communication path, and outputs data included in the acquired packet to the vehicle network.

To the vehicle sensor unit 15, various vehicle sensors provided in the automobile 10 are coupled. Here, an acceleration rate sensor 21, corner radar 22, a stereo camera 23, Lidar 24, an omnidirectional camera 25, and a GNSS receiver 26 are illustrated as the vehicle sensors. The vehicle sensor unit 15 outputs, to the vehicle network, detection data by the vehicle sensors coupled to the vehicle sensor unit 15. Moreover, the vehicle sensor unit 15 may generate secondary detection data based on the detection data by the vehicle sensors and output the generated secondary detection data to the vehicle network.

The GNSS receiver 26 receives radio waves from GNSS (Global Navigation Satellite System) satellites 110 and obtains latitude, longitude, and altitude as a current position of the vehicle, and the current time.

The acceleration rate sensor 21 detects an acceleration rate of the automobile 10. Examples of the acceleration rate sensor 21 include those of an axial type that detect a longitudinal acceleration rate, a lateral acceleration rate, and a vertical acceleration rate of the automobile 10. Timeintegrating the acceleration rate makes it possible to obtain a speed of the automobile 10. In this case, the vehicle sensor unit 15 is able to detect motions of the automobile 10 in a yaw direction, a pitch direction, and a roll direction based on detection values of the acceleration rate sensor 21.

The corner radar 22 is provided at four corners of the automobile 10, i.e., at right front, left front, right rear, and left rear corners. The corner radar 22 detects a distance to a surrounding object approaching the corner of the automobile 10 from outside. Examples of surrounding objects include other moving objects such as preceding vehicles, and fixed objects such as traffic lights provided at, for example, intersections of roads.

The stereo camera 23 includes, for example, a pair of cameras spaced apart by a predetermined distance. The stereo camera 23 captures, with the pair of cameras, an outside view of the vehicle in a frontward direction, i.e., a direction of travel of the automobile 10. For example, the vehicle sensor unit 15 may analyze captured images by, for example, pattern matching, recognize a predetermined three-dimensional surrounding object such as lane lines on both left and right sides of a travel route along which the vehicle is traveling, or preceding vehicles, and generate the detection data regarding a direction and an interval from the vehicle with respect to the object outside the vehicle based on a difference in the positions of the recognized surrounding object in the captured images by the pair of cameras.

The omnidirectional camera 25 captures images of 360 degrees around the automobile 10. The omnidirectional camera 25 may include multiple cameras configured to capture images within respective predetermined angles of view.

The Lidar 24 is provided in a front part of the automobile 10. The Lidar 24 scans, with detection waves, a frontward view of the automobile 10 in the direction of travel of the automobile 10 and detects space data regarding presence or absence of reflected waves and a distance. When there are no three-dimensional surrounding objects in a direction in which the detection waves are outputted, no reflected waves are obtained. When there is a three-dimensional surrounding object in the direction in which the detection waves are outputted, it is possible to detect a relative distance to the surrounding object by a period until reception of the reflected waves.

The stereo camera 23, the omnidirectional camera 25, and the Lidar 24 detect the space data regarding the surroundings of the automobile 10. The Lidar 24 is usually configured to acquire the space data regarding a range of a longer distance than the stereo camera 23 or the omnidirectional camera 25. However, the stereo camera 23 and the omnidirectional camera 25 of high resolution are configured to obtain, by using an optical member such as a telephoto lens in combination, based on images of the optical member, captured images of a surrounding object at a great distance equivalent to the Lidar 24, by image analysis, with recognizable resolution.

When a level of automated driving to be carried out by the travel controller 16 is, for example, the level 3 or higher, it is necessary for the vehicle sensor unit 15 to carry out a control of analyzing the space data regarding the surroundings, and generating recognition data regarding the travel route around the automobile 10 or recognition data regarding surrounding objects around the automobile 10, based on, for example, an instruction by the travel controller 16.

To the driving operation unit 14, unillustrated members such as a steering wheel, a brake pedal, an accelerator pedal, and a shift lever are coupled as operation members for a user to control the travel of the automobile 10. When the operation member is operated, the driving operation unit 14 outputs data including, for example, presence or absence of an operation and an amount of the operation, to the vehicle network. Moreover, the driving operation unit 14 may carry out processing related to the operations on the operation members, and incorporate the processing result in the data. For example, in a situation where there is another automobile or a fixed object in the direction of travel of the automobile 10, when the accelerator pedal is operated, the driving operation unit 14 may determine an abnormal operation, and incorporate the determination result in the data.

The travel controller 16 includes a vehicle memory 31 and a vehicle ECU (Electronic Control Unit) 32.

The vehicle memory 31 may include, for example, a semiconductor memory or an HDD. The vehicle memory 31 holds, for example, a program to control the travel of the automobile 10, and data to be used in the control. Here, vehicle high-precision map data 33 regarding an area where the automobile 10 travels is given as an example. The vehicle high-precision map data 33 may be, for example, cached from an unillustrated map server apparatus with the use of a wireless communication unit or held in a portable semiconductor memory.

The vehicle ECU 32 is a computer device of the automobile 10. The vehicle ECU 32 reads and executes the program held in the vehicle memory 31. Thus, the vehicle ECU 32 functions as the travel controller 16 that makes an overall control of the travel of the automobile 10.

The vehicle ECU 32 as the travel controller 16 generates a control value that controls the travel of the automobile 10, and outputs the control value to the driving controller 11, the steering controller 12, and the braking controller 13.

Here, the travel controller 16 controls the travel of the automobile 10 by generating the control value corresponding to data regarding a driving operation by a driver inputted from the driving operation unit 14. In addition, the travel controller 16 may control the travel of the automobile 10 by generating the control value for driver assistance that adjusts the driving operation by the driver, or may control the travel of the automobile 10 by generating the control value by highly autonomous automated driving that is not based on the driving operation by the driver. Driver assistance basically corresponds to the automated driving of the level 1 and the level 2 that controls the travel of the automobile 10 under monitoring by the driver. Highly autonomous automated driving basically corresponds to the automated driving of the level 3 or higher that controls the travel of the automobile 10 under monitoring by the control system of the automobile 10.

Moreover, the travel controller 16 may carry out a control of switching the level of the automated driving during the travel in accordance with, for example, the travel environment of the vehicle, a state of the vehicle, and a state of the driver, based on, for example, the detection data acquirable from the vehicle sensor unit 15. The travel controller 16 may determine, for example, the travel environment of the vehicle, the state of the vehicle, and the state of the driver, based on, for example, the detection data acquired from, for example, the vehicle sensor unit 15, and carry out the automated driving of the highest level that is available under the determination result.

The driving controller 11 controls operation of an unillustrated power source of the automobile 10. Examples of the power source of the automobile 10 includes an engine and a motor. The driving controller 11 controls the operation of the power source based on the control value generated by the travel controller 16.

The steering controller 12 controls operation of an unillustrated steering device of the automobile 10. Examples of the steering device of the automobile 10 include those of a by-wire type that controls a direction of steering and an amount of steering in accordance with an amount of rotation of the motor. The steering controller 12 controls the operation of the steering device based on the control value generated by the travel controller 16.

The braking controller 13 controls operation of an unillustrated braking device of the automobile 10. Examples of the braking device of the automobile 10 include those of a by-wire type that controls hydraulic pressure by the amount of rotation of the motor. The braking controller 13 controls the operation of the braking device based on the control value generated by the travel controller 16.

By the operation of these controllers that carry out the controls, the automobile 10 is able to travel in accordance with the travel control by the travel controller 16.

As described, the control system of the automobile 10 is requested to carry out a more complicated and more advanced control as it attempts to cope with the automated driving of the higher levels.

Moreover, to put the advanced automated driving into practical use in the automobile 10, it is necessary to provide the automobile 10 with, at least, the numerous vehicle sensors as described above, to obtain data necessary for the advanced automated driving.

For example, in carrying out the travel control of the higher levels such as the level 3 and the level 4, it is necessary for the control system of the automobile 10 to include, for example, the Lidar 24 and the omnidirectional camera 25 that detect the surroundings of the automobile 10, and generate, with a high degree of certainty, the recognition data regarding the recognition data regarding the travel route around the automobile 10 and various surrounding objects based on the space data regarding the surroundings detected by the Lidar 24 and the omnidirectional camera 25. In addition, the control system of the automobile 10 has to carry out the travel control based on the recognition data, to maintain the travel along the lane while, for example, avoiding an obstacle. This means a significant increase in a processing load on the automobile 10, as compared to a case where the travel control of the level such as the level 1 and the level 2 can be carried out by, for example, a lane keeping control based on pattern recognition of lanes based on captured images at short distances or an adaptive cruise control (preceding vehicle following control) based on pattern recognition of a preceding vehicle based on the captured images at short distances. In the travel control of the higher levels such as the level 3 and the level 4, it is necessary to raise the certainty of recognition by the similar recognition processing with processing using machine-learned artificial intelligence.

Moreover, the automobile 10 is intended to move, and it is necessary to operate the numerous vehicle sensors at high speeds to constantly monitor the situation around the automobile 10 while traveling basically in a parasitic state. In the automobile 10 adapted for the travel control of the higher levels, it is necessary to repeatedly detect the detection data based on detection values by the numerous vehicle sensors at short-time intervals, and to repeatedly carry out the travel control on short control cycles based on the detection data repeatedly detected at the short-time intervals. As the automobile is adapted for the automated driving of the higher levels, the performance desired for the automobile 10 becomes significantly higher.

Thus, in the automobile 10 adapted for the automated driving of the high level, it is conceivable to reduce the burden on the automobile 10 while traveling, by assisting in the travel control of the automobile 10 that carries out the travel control of the high level, with the use of a server apparatus 41 configured to communicate with the automobile 10 through the base station 40.

FIG. 2 is an explanatory diagram of an example of a travel control assistance system 1 configured to be used for assistance in the travel of the automobile 10 in FIG. 1.

Solid lines in FIG. 2 indicate the two base stations 40, the single server apparatus 41, and carrier communication cables 42 as a backhaul to which they are coupled, as constituent elements of the travel control assistance system 1.

Moreover, in FIG. 2, GNSS satellites 110 are also illustrated. The GNSS satellites 110 are located on satellite orbits of the earth and send out radio waves toward the surface of the earth. The radio waves of the GNSS satellites 110 include data regarding latitude, longitude, and altitude that indicate positions of respective satellites, and data regarding the absolute time that attains synchronization among multiple satellites. By similarly receiving the radio waves of the GNSS satellites 110, for example, the control system of the automobile 10 and the server apparatus 41 are able to synchronize, to a high degree, the data regarding latitude, longitude, and altitude that precisely indicate respective positions of spots of reception, and the precise time at the spots of reception.

Moreover, the travel control assistance system 1 indicated by the solid lines in FIG. 2 as mentioned above is an example of a configuration of a minimum local system 43 that is able to realize travel assistance in a narrow area.

Here, the server apparatus 41 communicates with the vehicle communication unit 17 of the control system of each of the automobiles 10 traveling in zones of the two base stations 40.

The server apparatus 41 acquires the detection data from the control system of each of the automobiles 10.

The server apparatus 41 generates assistance data available to the travel controller 16 of each of the automobiles 10 for the travel control, based on the detection data acquired from the automobiles 10.

The server apparatus 41 transmits the generated assistance data to the vehicle communication unit 17 of each of the automobiles 10 by wireless communication through the base stations 40.

Thus, each of the automobiles 10 traveling in the zones of the two base stations 40 is able to travel safely based on the assistance data acquired from the server apparatus 41 not to interfere with, for example, travel of other automobiles.

In this case, each of the traveling automobiles 10 receives assistance by the server apparatus 41 of the travel control assistance system 1. Each of the traveling automobiles 10 does not need to carry out an advanced control based on the detection data in its own control system. This may lead to reduction in the burden on the traveling automobile 10.

However, when the server apparatus 41 assists in the travel control of the automobile 10, it takes time to perform, for example, communication between the automobile 10 and the server apparatus 41, as compared with the case where data is processed in the automobile 10 itself. When delay time is short and stable, a control delay is less likely to occur with respect to the control in the automobile 10. But when the delay time becomes absolutely long or unstable, possibility becomes higher that the control delay occurs with respect to the control in the automobile 10. Possibility becomes higher that the automobile 10 becomes unable to continuously acquire appropriate data from the server apparatus 41 on each control cycle.

In particular, the automobile 10 moves by traveling. Accordingly, a communication path between the automobile 10 and the server apparatus 41 includes the wireless communication through the base stations 40. In addition, as the automobile 10 moves, the base stations 40 must be switched to allow the automobile 10 to use the wireless communication. In such communication environment, to allow the server apparatus 41 to assist in the travel of the automobile 10, it is necessary to realize, for example, a small delay by suppressing the control delay caused by communication, and allow for stabilization of an amount of delay caused by the small delay to prevent excessive fluctuation of the amount of delay even when the base stations 40 are switched.

Moreover, an area that can be covered by the solid lines in the travel control assistance system 1 in FIG. 2 is limited to a narrow first area in which the two base stations 40 can communicate. The automobile 10 is able to receive the travel assistance by the server apparatus 41 while traveling in the first area. But in a second area outside the first area, the automobile 10 is unable to receive the travel assistance by the server apparatus 41 even if there are other base stations 40 in the second area.

To realize the travel assistance in the second area, it is necessary to add another server apparatus 44 indicated by broken lines coupled to the base station 40 in the second area. Moreover, when the automobile 10 travels to move from the first area to the second area, it is necessary to transmit data from the server apparatus 41 in the first area to the other server apparatus 44 in the second area. The server apparatus 41 in the first area must communicate with the other server apparatus 44 in the second area through a gateway apparatus 46 indicated by broken lines in the figure. When hands-over communication occurs between the server apparatuses 41 and 44, there is higher possibility that, for example, time for the hands-over communication causes the other server apparatus 44 in the second area to delay starting to assist in the travel of the automobile 10 that newly travels in the second area. In particular, when the other server apparatus 44 in the second area is coupled to a wide-area communication network 45 such as the Internet as indicated by broken lines in the figure, it takes time to perform communication, and communication time easily becomes unstable. In this case, even if the other server apparatus 44 in the second area is able to obtain data from the server apparatus 41 in the first area, there is possibility that it takes excessive time before the other server apparatus 44 in the second area becomes ready to assist the control system of the automobile 10 in the travel control through the other base station 40 in the second area.

It is conceivably desirable that the travel control of the automobile 10 is repeated, generally, at least every several hundred milliseconds, to be able to cope with unforeseen situations. In such a short period of time, it is not very easy to take over or repeat a travel assistance control of the automobile 10 through the wide-area communication network 45 such as the Internet. Even if this can be realized, remaining time available to the control system of the automobile 10 during the control cycle becomes conceivably very short. There is high possibility that the vehicle ECU 32 having higher processing capability is necessary, as compared to a case where all the controls from the processing on the detection data to the travel control are carried out autonomously in the automobile 10. This may possibly cancel out merits of the assistance in the travel control of the automobile 10 by the server apparatuses 50 (41 and 44).

These problems also apply to a case where the other server apparatus 44 is provided in a wide third area in which the first area and the second area are combined.

As described, in the travel control of the automobile 10, it is desired to solve at least the problems described in the forgoing while keeping overall balance, and to realize the assistance in the travel control of the automobile 10 by the server apparatuses 50 to obtain practicality. That is, what is desired for the travel control assistance system 1 for the automobile 10 is to realize, for example, the travel assistance by the server apparatuses 50 in a period of time that is as short and stable as possible to suppress a delay in the travel control of each of the automobiles 10, and to allow for the advanced assistance by the server apparatuses 50 in the travel control of the automobile 10.

FIG. 3 is a configuration diagram of the travel control assistance system 1 for the automobile 10 according to the first embodiment of the invention.

The travel control assistance system 1 in FIG. 3 is suitable for solving the problems mentioned above while keeping the overall balance, mainly with the suitable use of a carrier communication network. However, the travel control assistance system 1 in FIG. 3 is merely an example.

As illustrated in FIG. 3, the travel control assistance system 1 in this embodiment includes the server apparatuses 50 to assist in the travel control of the automobiles 10.

In FIG. 3, base station server apparatuses 51, acceleration server apparatuses 54, narrow-area server apparatuses 52, a wide-area server apparatus 53, and a high-order server apparatus 55 are illustrated as the server apparatuses 50. The wide-area server apparatus 53 and the high-order server apparatus 55 may each be provided in a plurality in the travel control assistance system 1.

The base station server apparatuses 51 are server apparatuses provided in the corresponding relation to the base stations 40. The base station server apparatuses 51 may be provided basically in one-to-one corresponding relation to the base stations 40. However, the single base station server apparatus 51 may be provided for the multiple base stations 40. The base station server apparatuses 51 may be provided as, for example, one of functions of the high-performance base stations 40 for 5G. Moreover, the base station server apparatus 51 mainly performs communication with the automobiles 10 in the zone of the base station 40.

The acceleration server apparatus 54 may be coupled to the base station server apparatus 51. The acceleration server apparatus 54 may be provided to reinforce a processing function of the base station server apparatus 51, when, for example, the numerous automobiles 10 are present in the zone because the zone of the base station 40 is wide. In this case, the acceleration server apparatus 54 may carry out processing having a heavy processing load, e.g., object extraction processing based on the space data and recognition processing of the extracted objects, in the control to be carried out by the base station server apparatus 51. AI processing by machine learning may be used in, for example, the object extraction processing and the recognition processing of the extracted objects. The single acceleration server apparatus 54 may be provided to correspond to the multiple base station server apparatuses 51. Providing the acceleration server apparatus 54 makes it possible to reduce the processing load on the base station server apparatus 51, and accelerate a control response of the base station server apparatus 51.

The base station server apparatuses 51 and the acceleration server apparatuses 54 are local server apparatuses that manage communication with the automobiles 10 with which the base stations 40 are configured to communicate. The local server apparatuses 51 and 54 are hatched in the figure.

The narrow-area server apparatuses 52 may be coupled to the carrier communication cables 42 that couple the base station server apparatuses 51 together. This makes it possible for the narrow-area server apparatuses 52 to function as higher-order server apparatuses of the base station server apparatuses 51 coupled to the carrier communication cables 42.

The wide-area server apparatus 53 may be coupled to the carrier communication cables 42 that couple the base station server apparatuses 51 together. This makes it possible for the wide-area server apparatus 53 to function as a higher-order server apparatus of the base station server apparatuses 51 coupled to the carrier communication cables 42.

Here, the narrow-area server apparatuses 52 and the wide-area server apparatus 53 are simply named after size relation of the areas they manage. In FIG. 3, the areas managed by the narrow-area server apparatuses 52 and the area managed by the wide-area server apparatuses 53 each overlap with adjacent ones. The areas overlap with one another at least in their boundaries, making it possible for the automobiles 10 to continuously receive the assistance in the travel control across the areas when the automobiles 10 travel in the entire wide area managed by the travel control assistance system 1 in FIG. 3.

The high-order server apparatus 55 is coupled to a carrier wide-area communication network 57. The carrier wide-area communication network 57 is, for example, an ATM communication network. The carrier wide-area communication network 57 may be coupled to, for example, the Internet through an unillustrated gateway apparatus.

Moreover, to the carrier wide-area communication network 57, all the narrow-area server apparatuses 52 and the wide-area server apparatus 53 are coupled. This makes it possible for the high-order server apparatus 55 to communicate with each of the base station server apparatuses 51 illustrated in FIG. 3 through the narrow-area server apparatuses 52 or the wide-area server apparatus 53.

As described, the travel control assistance system 1 in FIG. 3 includes the narrow-area server apparatuses 52 or the wide-area server apparatus 53, and the high-order server apparatus 55, as the higher-order server apparatuses of the base station server apparatuses 51. In this case, an assistance control to be carried out by the higher-order server apparatuses 52, 53, and 55 may be distributed among hierarchized server apparatuses. It is possible to reduce a processing load on each of the higher-order server apparatuses and accelerate a control response of each of the higher-order server apparatuses. The higher-order server apparatuses 52, 53, and 55 are not hatched in the figure.

These higher-order server apparatuses 52, 53, and 55 do not directly communicate with the automobiles 10 but communicate with the automobiles 10 through the local server apparatuses 51 and 54. The higher-order server apparatuses 52, 53, and 55 are able to establish communication that is not affected by, for example, wireless communication environment of each of the automobiles 10, and establish stable, small-delay communication.

The higher-order server apparatuses 52, 53, and 55 may make a traffic control or a remote control of the overall travel of the automobiles 10. For example, in the traffic control of the automobiles 10, the higher-order server apparatuses 52, 53, and 55 may offer data regarding a safe travelable range of the automobiles 10 by the traffic control, to each of the automobiles 10 as high-order assistance data. Moreover, in the remote control of the automobiles 10, the higher-order server apparatuses 52, 53, and 55 may offer data regarding a remote control value, to each of the automobiles 10 as the high-order assistance data.

Moreover, such server apparatuses 51 to 55 of multiple kinds transmit and receive data to and from one another through, for example, the carrier communication cables 42 and the carrier wide-area communication network 57. A communication partner of each server apparatus in this communication is another fixed server apparatus.

Thus, for communication among the server apparatuses 50, as illustrated in the figure, IPsec (Security Architecture for Internet Protocol)-VPN (Virtual Private Network) as a first virtual private network may be used. In the IPsec-VPN coupling, it is possible to fix a communication initiator and a communication target by mutual authentication of the server apparatus of the communication initiator and the server apparatus of the communication target. Moreover, in the IPsec-VPN coupling, it is possible to establish confidential, high-speed communication without encoding payload data in communication packets.

In contrast, for communication between the base station server apparatus 51 and the vehicle communication unit 17 of the automobile 10, SSL (Secure Sockets Layer)/TLS (Transport Layer Security)-VPN as a second virtual private network may be used. In the SSL/TLS-VPN coupling, it is possible not to fix the communication partner of the server apparatus by authentication by only the server apparatus at one of endpoints. However, in the SSL/TLS-VPN coupling, it is necessary to encode the payload data in the communication packets, to establish confidential, high-speed communication.

As described, in the travel control assistance system 1 in FIG. 3, the VPNs of different methods are used for the communication between the base station server apparatus 51 and the automobile 10, and the communication among the server apparatuses 50. It is possible to ensure connectivity to the automobile 10 by SSL/TLS-VPN, and to reduce the processing load for communication by IPsec-VPN and achieve high speed.

With such a travel control assistance system 1, it is possible to continuously offer a connected service for the high-level automated driving in a wide area.

Moreover, the local server apparatuses 51 and 54 such as the base station server apparatuses 51 function as relay server apparatuses for the assistance control of the automobiles 10 with respect to the narrow-area server apparatuses 52, the wide-area server apparatus 53, and the high-order server apparatus 55.

The narrow-area server apparatuses 52 and the wide-area server apparatus 53 function as relay server apparatuses for the assistance control of the automobiles 10 with respect to the high-order server apparatus 55.

These relay server apparatuses are configured to add data generated by themselves in the higher-order server apparatus or adjust data acquired from the higher-order server apparatus. Interposing the relay server apparatuses makes it possible for the higher-order server apparatus to transmit and receive data to and from the automobiles 10 without establishing wireless communication paths with the automobiles 10 through the base stations 40. In the entire travel control assistance system 1, it is possible not to use long-distance communication including the wireless communication through the base stations 40.

Moreover, the server apparatuses that assist in the travel of the automobiles 10 are hierarchized in the multiple ranks. This makes it possible for the server apparatuses 50 to distributively carry out various kinds of controls to assist the automobiles 10 in accordance with their positions of installation in their respective areas or their positions in the hierarchy.

For example, the local server apparatuses 51 and 54 such as the base station server apparatuses 51 are able to specialize in a control of continuously carrying out communication with each of the automobiles 10 in the zone on every travel control cycle.

The narrow-area server apparatuses 52 and the wide-area server apparatus 53 are able to specialize in the traffic control or the remote control that involves adjusting the travel of the automobiles 10 in an entirety of each area based on future prediction.

The high-order server apparatus 55 is able to specialize in the traffic control or the remote control based on future prediction for a wider area than the narrow-area server apparatuses 52 or the wide-area server apparatus 53. Moreover, the high-order server apparatus 55 is able to specialize in a management control of the entire travel control assistance system 1.

FIG. 4 is an explanatory diagram of a hardware configuration of a server apparatus 60 that can be used as the various server apparatuses in FIG. 3.

The server apparatus 60 in FIG. 4 includes a server communication unit 61, a server GNSS receiver 62, a server memory 63, a server CPU (Central Processing Unit) 64, and a server bus 65 to which these are coupled.

The base station server apparatuses 51, the acceleration server apparatuses 54, the narrow-area server apparatuses 52, the wide-area server apparatus 53, and the high-order server apparatus 55 in FIG. 3 may basically have the hardware configuration in FIG. 4.

However, it is desirable that, for example, the base station server apparatuses 51, and the local server apparatuses 51 and 54 hatched in FIG. 3 further include a base station communication unit 66, as indicated by broken lines in FIG. 4.

The base station communication unit 66 communicates with the vehicle communication unit 17 of the automobile 10 through the base station 40, and transmits and receives data to and from the vehicle communication unit 17. The base station communication unit 66 may establish communication paths by the SSL/TLS-VPN suitable for 1:N communication, with the respective vehicle communication units 17 of the automobiles 10, and transmit and receive data to and from the respective vehicle communication units 17 through the respective communication paths. The number N of the automobiles 10 with which the base station communication unit 66 is configured to communicate may be decided in accordance with processing capability of the server apparatus 60. Moreover, the processing capability of the server apparatus 60 may be decided based on the number of the base stations 40 coupled to the server apparatus 60, the size of an area in which the zone of the base station 40 is set, and the maximum number of the automobiles assumed in the area.

The server communication unit 61 communicates with other server apparatuses 68 used in the travel control assistance system 1. The server communication unit 61 establishes a communication path by the IPsec-VPN coupling, with, at least, one of the other server apparatuses 68 directly coupled by the carrier communication cables 42. The server communication unit 61 may establish a communication path by, for example, the IPsec-VPN coupling, through the other server apparatuses 68, with another of the other server apparatuses 68 that is not directly coupled. For example, the base station server apparatus 51 may establish a communication path with the narrow-area server apparatus 52 or the wide-area server apparatus 53 to which the base station server apparatus 51 is directly coupled, and establish a communication path with the high-order server apparatus 55 through the carrier wide-area communication network 57.

The server GNSS receiver 62 receives radio waves from the GNSS satellites 110 and obtains latitude, longitude, and altitude of the position of installation of the server apparatus 60, and the current time. The current time is basically the same as the time acquired by the GNSS receiver 26 of the control system of each of the automobiles 10. This makes it possible for the server apparatus 60 and the automobile 10 to carry out their respective controls under the absolute time common to each other. For example, it is possible to use the detection time by the vehicle sensor unit 15 in the automobile 10, as it is, in the calculation with the time in the server apparatus 60.

The server memory 63 holds programs to be executed by the server CPU 64, and data. The server memory 63 may include, for example, a semiconductor memory and an HDD.

The server memory 63 holds, for example, service-area high-precision map data 67 regarding a service area of the server apparatus 60. In the case of the base station server apparatus 51, at least the high-precision map data 67 regarding the area corresponding to the zone of the base station 40 may be held. In the case of the narrow-area server apparatuses 52 or the wide-area server apparatus 53, at least the high-precision map data 67 regarding the area covered by the base stations 40 coupled to respective ones of the narrow-area server apparatuses 52 or the wide-area server apparatus 53 may be held. In the case of the high-order server apparatus 55, the high-precision map data 67 regarding all the areas in FIG. 3 may be held. The high-precision map data 67 in the high-order server apparatus 55 may be, for example, high-precision map data regarding the entirety of Japan.

Here, the service-area high-precision map data 67 may be high-precision three-dimensional map data regarding roads on which automobiles travel. Such service-area high-precision map data 67 may include data indicating a centerline of each lane of the road on which the automobile 10 travels, and boundary lines of each lane. Moreover, at an intersection or a junction, the high-precision map data 67 may include a guideline for, for example, steering. The guideline includes data regarding a shape or a gradient of each lane of the road, by its inclination or curve. In addition, the high-precision map data 67 may include data regarding surrounding objects recognizable from the automobile 10 while traveling, e.g., road signs, marks, and traffic lights.

Furthermore, it is possible to map, for example, the current positions of the automobiles 10 onto the travel route map based on the high-precision map data 67. With the travel route map onto which the automobiles 10 are mapped, it is possible to grasp, for example, not only an inter-vehicle distance from each of the automobiles 10 to a preceding vehicle and a traveling lane of each of the automobiles 10 but also travel environment ahead of the preceding vehicle, as the travel environment for each of the automobiles 10. It is possible to grasp the travel environment in a range beyond the range graspable by the vehicle sensors of the automobile 10.

In addition, it is desirable that multiple pieces of the high-precision map data 67 held in the server apparatuses 50 be generated based on, for example, the same high-precision map data, to ensure consistency among the multiple pieces of the map data. This allows for continuous and consistent management of the automobiles 10 traveling to move across area boundaries.

The server CPU 64 reads the program from the server memory 63 and executes the program. Thus, a server controller is realized in the server apparatus 60.

The server CPU 64 as the server controller controls overall operation of the server apparatus 60. The server controllers of the server apparatuses 50 that constitute the travel control assistance system 1 realize various controls to assist in the travel control of the automobiles 10, by cooperation of the server apparatuses 50.

For example, the server CPU 64 of the base station server apparatus 51 carries out, for example, an establishment control of the communication path with each of the automobiles 10 in the zone of the base station 40, a data transmission and reception control to and from each of the automobiles 10 with the use of the established communication path, an establishment control of the communication path with, for example, the higher-order narrow-area server apparatus 52 or the wide-area server apparatus 53, or the high-order server apparatus 55, and a data transmission and reception control to and from the higher-order server apparatus with the use of the established communication path, and a processing control of the acquired detection data.

The narrow-area server apparatus 52 or the wide-area server apparatus 53 carries out, for example, an establishment control of the communication path with the base station server apparatus 51 to which it is coupled, a data transmission and reception control to and from the base station server apparatus 51 with the use of the established communication path, an establishment control of the communication path with, for example, the higher-order high-order server apparatus 55, a data transmission and reception control to and from, for example, the higher-order server apparatus with the use of the established communication path, and a processing control of the acquired detection data.

The high-order server apparatus 55 carries out, for example, an establishment control of the communication path with the lower-order narrow-area server apparatus 52, the wide-area server apparatus 53, or the base station server apparatus 51, a data transmission and reception control to and from the lower-order server apparatus with the use of the established communication path, and a processing control of the acquired detection data.

FIG. 5 is an explanatory diagram of various functions realized to assist in the travel control of the automobiles, in the server apparatuses 50 of the travel control assistance system 1 in FIG. 3.

FIG. 5 illustrates individual assistance units 71 including a remote detection unit 72, and a high-order assistance unit 73, as the various functions to be realized in the travel control assistance system 1.

These functions are realized in any one of the server apparatuses 50 by the server CPU 64 executing the program.

Moreover, FIG. 5 also illustrates the vehicle sensor unit 15, the vehicle communication unit 17, and the travel controller 16, with respect to the control system of the automobile 10.

In the automobile 10, the vehicle sensor unit 15 acquires the detection data by the vehicle sensors and data regarding a travel state and travel environment of the automobile 10 based on the detection data. The detection data by the vehicle sensor unit 15 includes a current position and a direction of the automobile 10, the current time, a direction and a value of a current speed of the automobile 10. Moreover, based on, for example, the captured images detected, the vehicle sensor unit 15 may generate, for example, recognition data regarding actual lane lines near the vehicle, and recognition data regarding surrounding objects such as an actual preceding vehicle near or around the vehicle. These pieces of the recognition data become necessary in the travel control of the automated driving of the levels 3 or higher.

The vehicle communication unit 17 transmits, for example, the detection data by the vehicle sensor unit 15 to the individual assistance unit 71 corresponding to the vehicle by the wireless communication through the base stations 40. The vehicle communication unit 17 receives and acquires the assistance data from the individual assistance unit 71 corresponding to the vehicle by the wireless communication through the base stations 40.

Basically, the travel controller 16 autonomously controls the travel of the vehicle based on the detection data by the vehicle sensor unit 15 and the secondary detection data such as various kinds of the recognition data based on the detection data.

The individual assistance units 71 are generated in, for example, the base station server apparatus 51 coupled to the base station 40 with which the automobile 10 can directly communicate, in the corresponding relation to the respective automobiles 10 present in the zone of the base station 40. It is to be noted that, when the automobiles 10 are traveling as one group, the individual assistance unit 71 may be created in the corresponding relation to the group.

The individual assistance unit 71 establishes a communication path including the wireless communication through the base stations 40, with the vehicle communication unit 17 of the corresponding automobile 10. The individual assistance unit 71 transmits and receives data to and from the vehicle communication unit 17 of the corresponding automobile 10. For example, the individual assistance unit 71 receives and acquires, for example, the detection data from the travel controller 16 of the corresponding automobile 10. The individual assistance unit 71 generates the assistance data available to the travel controller 16 of the corresponding automobile 10 for the travel control, based on, for example, the detection data acquired from the corresponding automobile 10. The individual assistance unit 71 transmits and offers the generated assistance data to the travel controller 16 of the corresponding automobile 10. Thus, the individual assistance unit 71 is able to assist in the travel control of the corresponding automobile 10.

The remote detection unit 72 generates the recognition data regarding the travel route in the direction of travel of the corresponding automobile 10, and the recognition data regarding surrounding objects in the vicinity of the corresponding automobile 10, based on the space data regarding the surroundings, e.g., the captured images of the outside view of the corresponding automobile 10. Such processing of generating the recognition data regarding the surroundings based on the space data is a portion of processing in the control to be carried out by the individual assistance unit 71 to assist in the travel of the corresponding automobile 10, and is high-load processing with the use of, for example, artificial intelligence. The remote detection unit 72 may be created in the same base station server apparatus 51 as the individual assistance unit 71. Alternatively, the remote detection unit 72 may be created in the acceleration server apparatus 54 coupled to the base station server apparatus 51. Creating the remote detection unit 72 in the acceleration server apparatus 54 makes it possible to reduce the processing load on the base station server apparatus 51. This makes it possible for the base station server apparatus 51 to concentrate on, for example, the communication with the automobiles 10.

The high-order assistance unit 73 collects the data regarding the automobiles 10 corresponding to respective the individual assistance units 71, from the respective individual assistance units 71. With the use of the collected data regarding the automobiles 10, the high-order assistance unit 73 generates the high-order assistance data for the travel control of each of the automobiles 10 based on the travel states of the automobiles 10. Moreover, the high-order assistance unit 73 transmits and offers the high-order assistance data, not to the vehicle communication unit 17 itself of each of the automobile 10 but to the individual assistance units 71 created in the corresponding relation to the respective automobiles 10. The high-order assistance data is generated to be offered to each of the automobiles 10.

It is to be noted that, when the service area of the travel control assistance system 1 is considerably wide, e.g., the entirety of Japan, the high-order assistance unit 73 may come up distributively among the server apparatuses 50. For example, the high-order assistance unit 73 may come up as a high-order collection unit that collects the data regarding the automobiles 10, the high-order assistance unit 73 that generates the high-order assistance data regarding the automobiles 10, and the high-order assistance unit 73 that offers the high-order assistance data to the automobiles 10.

Moreover, the high-order assistance unit 73 basically comes up in the higher-order server apparatuses 52, 53, and 55 that are separate from the base station server apparatus 51. However, depending on the convenience of the system configuration, the high-order assistance unit 73 may come up in the local server apparatuses such as the base station server apparatus 51 and the acceleration server apparatus 54, together with the function of the vehicle communication unit 17.

As described, in the server apparatuses 50 as the entirety, the individual assistance units 71 and the high-order assistance unit 73 come up. All the functions in FIG. 5 come up distributively among the server apparatuses 50.

The server apparatuses 50 are each able to stably perform communication with one another with a small delay with the use of the communication path basically based on wired coupling that does not include the wireless communication between the automobile 10 and the base stations 40.

Moreover, the individual assistance units 71 created in the corresponding relation to the respective automobiles 10 each generate the data available to the travel controller 16 of the corresponding automobile 10 for the travel control, based on the data acquired from the corresponding automobile 10 and the high-order assistance data offered by the high-order assistance unit 73, and transmit the generated data to the vehicle communication unit 17 of the corresponding automobile 10.

Thus, the travel control assistance system 1 is able to offer the assistance data generated by the individual assistance units 71 and the assistance data generated by the high-order assistance unit 73 to the automobiles 10 by stable, small-delay communication.

Furthermore, the travel controller 16 of each of the automobiles 10 is able to control the travel of the vehicle with the use of these pieces of the assistance data offered by the travel control assistance system 1 together with the detection data by the vehicle.

In particular, in this embodiment, as described, for the communication among the server apparatuses 50, the first virtual private network is used. In the first virtual private network, with the use of the IPsec-VPN, the communication initiator and the communication target are fixed by the mutual authentication of the communication initiator and the communication target. This makes it possible to allow the communication among the server apparatuses 50 to be confidential, high-speed communication even if the payload data in the communication packets is not encoded. It is possible to shorten and stabilize the delay time until each of the individual assistance units 71 obtains the high-order assistance data.

In contrast, in this embodiment, for the communication through the base stations 40 between each of the automobiles 10 moving by traveling and the base station server apparatus 51 including the individual assistance unit 71, the second virtual private network is used. In the second virtual private network, with the use of SSL/TLS-VPN, the partner of the server apparatus is not fixed by the authentication of only the server apparatus at one of the endpoints of the communication. It is possible to freely change the partner of the server apparatus. Thus, the base station server apparatus 51 including the individual assistance unit 71 is able to encode the payload data in the communication packets with any automobiles 10, making it possible to realize confidential communication with flexibility with respect to the partner of the coupling.

As described, in this embodiment, multiple kinds of the virtual private networks are selectively used among the server apparatuses 50, and between the server apparatus and the automobile 10. Realizing communication by these suitable combinations makes it possible, in this embodiment, to ensure optimal coupling between apparatuses that communicate, and minimize, for example, a communication delay that causes a control delay. This leads to practical use of the travel control assistance system 1 to assist in the travel of the automobile 10.

FIG. 6 is a flowchart of the travel control of the automobile 10 configured to receive the travel assistance by the travel control assistance system 1 in FIG. 3.

The travel controller 16 of the automobile 10 may repeatedly carry out the travel control in FIG. 6, for example, each time the automobile 10 is started up.

In step ST1, the travel controller 16 determines whether the detection data by the vehicle sensors is acquired from the vehicle sensor unit 15.

In step ST2, the travel controller 16 determines whether or not to use the assistance by the server apparatuses 50 of the travel control assistance system 1. For example, the travel controller 16 may determine whether or not the assistance by the server apparatuses 50 is available, based on the current position of the vehicle. Moreover, for example, the travel controller 16 may determine whether or not the assistance is necessary, based on whether or not execution of the high-load control such as the automated driving of the level 3 or higher, e.g., L3 or L4, is requested by the driver, or in accordance with a state such as the remaining power of the battery of the vehicle. Furthermore, when the assistance by the server apparatuses 50 is available and the vehicle is going to use the assistance, the travel controller 16 causes the flow to proceed to step ST3 to receive the assistance in, for example, the high-load automated driving of the level 3 or higher. Otherwise, the travel controller 16 causes the flow to proceed to step ST6 to carry out the autonomously completed control.

In step ST3, the travel controller 16 transmits the detection data by the vehicle sensors acquired from the vehicle sensor unit 15, to the individual assistance unit 71 that comes up in, for example, the base station server apparatus 51 in the corresponding relation to the travel controller 16 itself. The vehicle communication unit 17 of the automobile 10 establishes the communication path through the SSL/TLS-VPN coupling with the server communication unit 61 of the base station server apparatus 51. The vehicle communication unit 17 of the automobile 10 encrypts the packet including the detection data by the vehicle sensors which the travel controller 16 requests to transmit, and transmits the encrypted packet to the server communication unit 61.

Upon the server communication unit 61 receiving the detection data by the vehicle sensors, the server controller of the base station server apparatus 51 generates the assistance data in accordance therewith, as described later. Moreover, in carrying out the assistance in the high-load control of the level 3 or higher, the server controller may generate the secondary detection data requested in L3 or L4, based on the acquired detection data by the vehicle sensors.

Furthermore, the server controller transmits the generated assistance data to the travel controller 16 of the automobile 10. The server communication unit 61 encrypts the packet including the assistance data, and transmit the resultant packet to the vehicle communication unit 17 through the communication path established between the server communication unit 61 and the vehicle communication unit 17. Thus, the vehicle communication unit 17 of the automobile 10 is able to receive the assistance data.

In step ST4, the travel controller 16 determines whether or not the assistance data from the individual assistance unit 71 have been acquired. When the vehicle communication unit 17 has not received the assistance data, the travel controller 16 determines that the assistance data from the individual assistance unit 71 has not been acquired, and repeats this process. Upon the vehicle communication unit 17 receiving the assistance data, the travel controller 16 determines that the assistance data from the individual assistance unit 71 has been acquired, and causes the flow to proceed to step ST5.

In step ST5, the travel controller 16 carries out the travel control of the vehicle based on the assistance data acquired from the vehicle communication unit 17 and the detection data by the vehicle sensors.

When the control value by, for example, the remote control is included in the assistance data, the travel controller 16 may control the travel in accordance with the control value. When data regarding the travelable range or a travel-restricted range by, for example, the traffic control is included in the assistance data, the travel controller 16 may generate the control value that allows for the travel within these ranges, and control the travel by the generated control value.

Moreover, on such travel, the travel controller 16 may adjust the control value to allow the vehicle to travel to keep to the travel route while traveling based on the detection data by the vehicle sensors, or allow the vehicle to travel not to interfere with surrounding objects recognized based on the detection data by the vehicle sensors.

Thus, for example, it is possible for the automobile 10 to travel while basically keeping to the travel route in accordance with the traffic control or the remote control by the travel control assistance system 1, and not to interfere with the surrounding objects.

Thereafter, the travel controller 16 causes the flow to proceed to step ST8.

In step ST6, to carry out the autonomously completed control, the travel controller 16 generates, in the vehicle, the secondary detection data to be involved in the high-load control of the level 3 or higher. For example, the travel controller 16 may generate the secondary detection data based on the space data regarding the surroundings of the vehicle. The secondary detection data may include the recognition data regarding lane lines of the travel route along which the vehicle is traveling, and the recognition data regarding surrounding objects such as other moving bodies around the vehicle. The travel controller 16 may use AI processing by machine learning in the object extraction processing from the space data and the recognition processing of the extracted objects.

In step ST7, the travel controller 16 carries out the travel control of the vehicle based on the detection data by the vehicle sensors. Here, the detection data by the vehicle sensors includes the secondary detection data generated in step ST6.

The travel controller 16 may generate the control value that allows the vehicle to keep to the travel route while traveling, based on the detection data by the vehicle, or generate the control value that allows the vehicle to travel not to interfere with the surrounding objects. Moreover, the travel controller 16 controls the travel in accordance with the generated control value.

Thus, it is possible for the automobile 10 to travel by the autonomous control by the vehicle, while basically keeping to the travel route, and not to interfere with the surrounding objects.

In step ST8, the travel controller 16 determines whether or not to end the travel control of the automobile 10. The travel controller 16 may determine that the travel control of the automobile 10 is to be ended, based on, for example, whether or not the automobile 10 has arrived at a destination and stopped. When the travel controller 16 does not determine that the travel control of the automobile 10 is to be ended, the travel controller 16 causes the flow to return to step ST1. The travel controller 16 repeats the processes of steps ST1 to ST8 until the travel controller 16 determines that the travel control of the automobile 10 is to be ended, and repeats the travel control of the automobile 10. When the travel controller 16 determines that the travel control of the automobile 10 is to be ended, the travel controller 16 ends this control.

FIG. 7 is a flowchart of an individual assistance control for the corresponding automobile 10 by the individual assistance units 71 in FIG. 5.

The individual assistance units 71 in FIG. 5 are created in, for example, the base station server apparatuses 51 in the corresponding relation to the automobiles 10.

The individual assistance units 71 in FIG. 5 each repeatedly carry out the individual assistance control in FIG. 7 to repeatedly acquire the detection data from the corresponding automobile 10 and continuously assist in the travel control of the corresponding automobile 10.

In step ST11, the individual assistance unit 71 determines whether or not new detection data has been received and acquired from the corresponding automobile 10. When no new detection data has been received, the individual assistance unit 71 repeats this process until the new detection data is received. Upon receiving the new detection data, the individual assistance unit 71 causes the flow to proceed to step ST12.

In step ST12, the individual assistance unit 71 determines whether or not the space data has been acquired in the acquired new detection data from the corresponding automobile 10. When the space data has been acquired, the individual assistance unit 71 causes the flow to proceed to step ST13 for the recognition processing based on the space data. When no space data has been acquired, the individual assistance unit 71 causes the flow to proceed to step ST15.

In step ST13, the individual assistance unit 71, as the remote detection unit 72, generates a three-dimensional space model of the surroundings of the corresponding automobile 10 based on the acquired space data, and carries out the extraction processing of objects such as the lane lines of the travel route or surrounding objects in the three-dimensional space model.

In step ST14, the individual assistance unit 71, as the remote detection unit 72, generates the recognition data regarding, for example, the shape of the travel route and the recognition data regarding, for example, the kinds and the sizes of the objects, the relative directions of the objects, and the relative distances to the objects, based on the objects extracted in step ST13. These pieces of data are the secondary detection data to be used to decide a course of the vehicle when the travel controller 16 carries out the control of the automated driving of the level 3 or higher.

It is to be noted that there is possibility that the individual assistance unit 71 itself includes the hierarchized server apparatuses 50, as the individual assistance unit 71 comes up in the base station server apparatus 51 and the remote detection unit 72 comes up in the acceleration server apparatus 54. In this case, the individual assistance unit 71 may allow the base station server apparatus 51 to request the acceleration server apparatus 54 to carry out the processes of steps ST13 and ST14, and acquire the result from the acceleration server apparatus 54.

In step ST15, the individual assistance unit 71 acquires the latest high-order assistance data acquired by the individual assistance unit 71 from the high-order assistance unit 73. The latest high-order assistance data may be temporarily held in the server memory 63.

In step ST16, the individual assistance unit 71 transmits the assistance data acquired by the processing described above to the corresponding automobile 10.

In step ST17, the individual assistance unit 71 transmits the detection data acquired from the corresponding automobile 10 in the current control, to the high-order assistance unit 73.

The individual assistance unit 71 may incorporate, together with the latest position of the automobile 10 to which it corresponds, for example, the time, a direction and magnitude of the speed, the recognition data regarding the surroundings generated by the individual assistance unit 71, in the detection data to be transmitted to the high-order assistance unit 73.

In contrast, the individual assistance unit 71 does not need to incorporate the space data such as the captured images acquired from the automobile 10 in the detection data to be transmitted to the high-order assistance unit 73. This makes it possible for the individual assistance unit 71 to offer data for enhancement of reliability of the traffic control or the remote control, to the high-order assistance unit 73, while reducing an amount of communication with the high-order assistance unit 73.

Thereafter, the individual assistance unit 71 ends this control.

As described, the individual assistance unit 71 generates and offers a portion of the detection data to be used for the automated driving in the corresponding automobile 10 in place of the control system of the automobile 10. The individual assistance unit 71 is able to function as an ECU outside the automobile 10.

Moreover, the base station server apparatus 51 in which the individual assistance unit 71 comes up transmits the high-order assistance data generated by the higher-order server apparatuses 52, 53, and 55 to the corresponding automobile 10, together with the assistance data generated by itself. The base station server apparatus 51 in which the individual assistance unit 71 comes up serves as the only server apparatus that directly communicates with each of the automobiles 10, in the travel control assistance system 1. Because the base station server apparatus 51 is a server apparatus coupled to the base station 40 used by the automobile 10 for communication, it is possible to respond to the automobile 10 in a relatively stable short time, even in communicating with the vehicle communication unit 17 of each of the automobiles 10 by the wireless communication through the base stations 40.

Being assisted by such an individual assistance unit 71 makes it possible for the automobile 10 to travel by the advanced automated driving of the level 3 or higher with the processing load for the advanced automated driving of the level 3 or higher reduced.

In particular, in this embodiment, the individual assistance units 71 provided in the base station server apparatuses 51 in the corresponding relation to the automobiles 10 each acquire the detection data by the vehicle sensors from the corresponding automobile 10 by the wireless communication through the base stations 40. The individual assistance units 71 each process the acquired detection data by the vehicle sensors to generate the secondary detection data, and transmit the generated secondary detection data to the vehicle communication unit 17 of the corresponding automobile 10. Specifically, for example, the individual assistance units 71 each acquire the detection data by the vehicle sensors including the space data obtained by detecting the surroundings of the automobile 10 by the vehicle sensors, from the corresponding automobile 10. The individual assistance units 71 each process the acquired space data regarding the surroundings, and generate the recognition data regarding the travel route around the automobile 10 or the recognition data regarding the surrounding objects around the automobile 10, as the secondary detection data. The individual assistance units 71 each transmit the generated secondary detection data regarding the recognition data regarding the travel route around the automobile 10 or the recognition data regarding the surrounding objects around the automobile 10, to the vehicle communication unit 17 of the corresponding automobile 10.

This makes it possible for the travel controller 16 of the automobile 10 according to this embodiment to carry out the high-level travel control with the use of the secondary detection data received by the vehicle communication unit 17 from the base station server apparatus 51 together with the detection data by the vehicle sensors of the vehicle, without processing, on their own in the automobile 10, the detection data by the vehicle sensors to generate the secondary detection data.

FIG. 8 is a flowchart of a travel assistance control of the automobiles 10 (high-order assistance control), by the high-order assistance unit 73 in FIG. 5.

The high-order assistance unit 73 in FIG. 5 is created in, for example, the narrow-area server apparatuses 52, the wide-area server apparatus 53, or the high-order server apparatus 55 separately from the individual assistance unit 71. It is to be noted that the high-order assistance unit 73 may come up distributively in, for example, the narrow-area server apparatus 52 and the high-order server apparatus 55, or alternatively, the high-order assistance unit 73 may come up distributively in the wide-area server apparatus 53 and the high-order server apparatus 55. Moreover, the high-order assistance unit 73 may be created together with the individual assistance unit 71 in, for example, the single base station server apparatus 51. The high-order assistance unit 73 may be created distributively in the higher-order server apparatuses in the corresponding relation to, for example, area division.

The high-order assistance unit 73 in FIG. 5 repeatedly carries out the high-order assistance control in FIG. 8 to repeatedly acquire the detection data regarding the automobiles 10 and continuously assists in the travel control of the automobiles 10.

The high-order assistance unit 73 assists in the travel control of the automobiles 10 by generating, for example, data regarding the traffic control and data regarding the remote control with respect to each of the automobiles 10.

In step ST21, the high-order assistance unit 73, as the high-order collection unit, receives and collects the detection data regarding the automobiles 10 corresponding to the respective individual assistance units 71, from the respective individual assistance units 71 created in the corresponding relation to the automobiles 10. The detection data regarding each of the automobiles 10 includes at least the latest positional data regarding, for example, the current position of each of the automobiles 10.

Moreover, the high-order assistance unit 73 may also collect, from other automobiles traveling in the service area without using the travel control assistance system 1, the detection data such as the latest positional data regarding each of the automobiles. Such an automobile 10 may directly communicate with a server apparatus in which the high-order assistance unit 73 comes up.

In step ST22, the high-order assistance unit 73 develops and generates a travel route map of the service area based on the high-precision map data 67 held in the server memory 63, and maps, for example, the collected latest positions of the automobiles 10 onto the travel route map of the service area. This makes it possible for the high-order assistance unit 73 to obtain data regarding the travel environment of the automobiles 10 in the service area.

Here, the travel route map may include, for example, each road or each lane in the service area represented by a line segment. In this case, the high-order assistance unit 73 maps each of the automobiles 10 onto a position corresponding to the latest position on the line segment corresponding to a road or a lane on which each of the automobiles 10 is traveling. In addition, for example, the travel route map may include a combination of the line segment corresponding to the road or the lane as mentioned above, and a time axis. In this case, the high-order assistance unit 73 is able to map not only the position of each of the automobiles 10 but also a travel speed of each of the automobiles 10.

Moreover, the high-order assistance unit 73 may map, for example, traffic data, restriction data, and construction data by, for example, the ADAS onto the travel route map of the service area based on the high-precision map data 67.

Furthermore, the high-order assistance unit 73 may map data regarding other moving bodies or fixed objects recognized near each of the automobiles 10 onto the travel route map of the service area based on the high-precision map data 67.

In step ST23, the high-order assistance unit 73 obtains travel conditions of the respective automobiles 10 traveling in the service area, on the travel route map of the service area onto which the automobiles 10 are mapped. Moreover, the high-order assistance unit 73 generates the high-order assistance data regarding the travel control of each of the automobiles 10 based on the travel conditions obtained for each of the automobiles 10 and an estimation of travel conditions afterward.

For example, on the travel route map of the service area, when the automobile 10 related to the processing does not interfere with surrounding objects even if the automobile 10 travels as it is, the high-order assistance unit 73 generates, as the high-order assistance data in the traffic control, the data regarding the travelable range or the travel-restricted range to continue the travel along the current travel route as it is. Alternatively, the high-order assistance unit 73 generates, as the high-order assistance data in the remote control, the control value to continue the travel along the current travel route as it is.

In addition, for example, on the travel route map of the service area, when the automobile 10 related to the processing may possibly interfere with surrounding objects even if the automobile 10 travels as it is, the high-order assistance unit 73 generates, as the high-order assistance data in the traffic control, the data regarding the travelable range or the travel-restricted range to change the current travel to inhibit the interference. Alternatively, the high-order assistance unit 73 generates the control value to change the current travel to inhibit the interference, as the high-order assistance data in the remote control.

Moreover, the high-order assistance unit 73 may generate these pieces of the high-order assistance data in consideration of characteristics of a driver of each of the automobiles 10. Characteristic data regarding the driver of each of the automobiles 10 may be held in advance in the server memory 63. In this case, for example, the high-order assistance unit 73 may assume an inter-vehicle distance that makes it possible to ensure safety of each of the automobiles 10 to be a minimum. Moreover, the high-order assistance unit 73 may also assume a distance obtained by adding or subtracting a distance corresponding to a deviation of an inter-vehicle distance ensured by the driver themselves to or from the minimum to be inter-vehicle distance data in the high-order assistance data.

In step ST24, the high-order assistance unit 73 transmits and offers the high-order assistance data generated for each of the automobiles 10 traveling in the service area, to the individual assistance unit 71 corresponding to the relevant one of the automobiles 10. This makes it possible for each of the individual assistance units 71 to receive and acquire the high-order assistance data regarding the corresponding automobile 10 from the high-order assistance unit 73.

As described, in this embodiment, the high-order assistance unit 73 included in the server apparatuses 50, as the high-order collection unit, collects the data regarding at least the positions of the automobiles 10 corresponding to the respective individual assistance units 71, from the respective individual assistance units 71. Moreover, the high-order assistance unit 73 maps the positions of the automobiles 10 collected by the high-order collection unit onto the travel route map based on the high-precision map data 67. Based on the travel conditions on the travel route map onto which the automobiles 10 are mapped, the high-order assistance unit 73 generates the high-order assistance data available to the travel controller 16 of each of the automobiles 10 for the high-level travel control in accordance with the travel environment of each of the automobiles 10. Here, the high-order assistance data to be generated by the high-order assistance unit 73 in accordance with the travel environment of each of the automobiles 10 may be, for example, data for the traffic control that notifies each of the automobiles 10 of the travelable range or the travel-restricted range, or the control value for the remote control to be used by the travel controller 16 of each of the automobiles 10 for the travel control.

By acquiring such high-order assistance data through the individual assistance unit 71, the travel controller 16 of each of the automobiles 10 is able to carry out the travel control not to interfere with, for example, other nearby automobiles. By carrying out the travel control in accordance with the high-order assistance data, in a state where, for example, another automobile is farther away from the automobile 10 than a distance at which an avoidance control is started in the autonomous control based on the detection data by the vehicle sensors, the travel controller 16 of each of the automobiles 10 is able to carry out the travel control to avoid interference with the other automobile. By acquiring the high-order assistance data, each of the automobiles 10 is able to realize more stable travel, as compared with the autonomous travel control based on the detection data by the vehicle sensors.

Moreover, the individual assistance units 71 described above are generated in the base station server apparatuses 51 in the corresponding relation to the respective automobiles 10.

It is desirable that, as the automobile 10 moves by traveling, the individual assistance unit 71 corresponding to the relevant automobile 10 be created and dynamically switched among the base station server apparatuses 51, as with the base station server apparatus 51 being switched to a different one from the previous one.

FIG. 9 is a flowchart of an example of a management control of the individual assistance units 71 corresponding to the automobiles 10 in the base station server apparatus 51 including the individual assistance units 71 in FIG. 5.

The server CPU 64 of the base station server apparatus 51 repeatedly carries out the management control of the individual assistance units 71 in FIG. 9.

In step ST31, the server CPU 64 of the base station server apparatus 51 determines presence or absence of any new requests for the creation of the individual assistance unit 71.

The travel controller 16 of the automobile 10 may transmit a creation request to the base station server apparatus 51 by the wireless communication through the base stations 40, when: for example, the driver gets on the automobile 10; the automobile 10 starts traveling; the traveling automobile 10 enters the service area of the travel control assistance system 1; or the driver makes a predetermined operation in the service area of the travel control assistance system 1.

Moreover, as described later, when the automobile 10 under management moves out of the area, the base station server apparatuses 51 transmit the creation request to the base station server apparatus 51 for the area to which the automobile 10 has moved.

With the presence of any of such creation requests, the server CPU 64 determines the presence of a new request for the creation of the individual assistance unit 71, and causes the flow to proceed to step ST32. Otherwise, the server CPU 64 determines the absence of the new request for the creation of the individual assistance unit 71, and causes the flow to proceed to step ST33.

In step ST32, the server CPU 64 creates the individual assistance unit 71 corresponding to the automobile 10 related to the new creation request, in its base station server apparatus 51. For example, the server CPU 64 may newly issue identification data for each individual assistance unit 71 created in its base station server apparatus 51, and dynamically create a work area to which the identification data is attached, in the server memory 63. Moreover, the server CPU 64 may record data regarding the automobile 10 corresponding to the relevant individual assistance unit 71 in the created work area. The server CPU 64 repeats the individual assistance control in FIG. 7 with the sequential use of data regarding the work areas reserved for the respective automobiles 10 in the server memory 63. This makes it possible for the server CPU 64 to carry out the individual assistance control corresponding to the automobiles 10. Thereafter, the server CPU 64 may end this control.

In step ST33, the server CPU 64 determines presence or absence of any automobiles 10 moving out of the area, out of the automobiles 10 under its management. The server CPU 64 may predictively determine the out-of-area movement of the automobile 10 under its management, based on, for example, the position and the direction of movement of the relevant automobile 10.

With the presence of any automobiles 10 moving out of the area, the server CPU 64 causes the flow to proceed to step ST34. Otherwise, the server CPU 64 causes the flow to proceed to step ST35.

In step ST34, the server CPU 64 transmits the creation request to the base station server apparatus 51 for the area to which the automobile 10 is going to move. The creation request may include the data regarding the work area acquired by itself with respect to the automobile 10 that is going to move out of the area. Thus, the base station server apparatus 51 for the area to which the automobile 10 is going to move is able to take over the data regarding the automobile 10 that enters from outside the area, from the base station server apparatus 51 from which the automobile 10 is going to move. This leads to seamless assistance that hardly causes inconsistency.

Thereafter, the server CPU 64 may delete, for example, the data regarding the individual assistance unit 71 corresponding to the automobile 10 that has moved out of the area, from its base station server apparatus 51, and end this control.

In step ST35, the server CPU 64 determines presence or absence of any continuously undetected automobiles 10, out of the automobiles 10 under its management.

When finishing the travel, the automobile 10 stops the operation including the travel controller 16. In this case, the automobile 10 stops transmitting the detection data by the vehicle sensors to the corresponding individual assistance unit 71.

The server CPU 64 may record the time of a final data update in, for example, the work area reserved for each of the automobiles 10 in the server memory 63. In this case, for example, when a time difference between the current time and the time of the final data update becomes larger than a threshold value, the server CPU 64 may determine that the undetected state continues. The threshold value is equal to or larger than a travel control cycle of the automobile 10. The server CPU 64 may determine the continuation of such an undetected state for all the work areas reserved in the server memory 63, to determine the presence or the absence of any continuously undetected automobiles 10.

With the presence of the continuously undetected automobile 10, the server CPU 64 causes the flow to proceed to step ST36. Otherwise, the server CPU 64 ends this control.

In step ST36, the server CPU 64 deletes, from its base station server apparatus 51, the data regarding the individual assistance unit 71 corresponding to the continuously undetected automobile 10. The server CPU 64 may delete and release, for example, the work area reserved in the server memory 63 in the corresponding relation to the relevant automobile 10. Thereafter, the server CPU 64 ends this control.

Such a management control of the individual assistance units 71 is carried out in the base station server apparatuses 51. Thus, the hands-over of the base stations 40 in accordance with the movement of each of the automobiles 10 causes the dynamic switching of the allocation of the individual assistance unit 71, to the base station server apparatus 51 coupled to the base station 40 with which the automobile 10 that has moved newly communicates. The individual assistance unit 71 appears to dynamically move among the base station server apparatuses 51 in accordance with the movement of the corresponding automobile 10. The base station server apparatus 51 is an example of an area server apparatus.

As described, in this embodiment, the individual assistance unit 71 corresponding to each of the traveling automobiles 10 comes up in the base station server apparatus 51 corresponding to the base station 40 with which the vehicle communication unit 17 of the relevant one of the automobiles 10 communicates, among the base station server apparatuses 51 provided for each area in which the one or more base stations 40 are provided. Each of the base station server apparatuses 51 may be provided, for example, integrally with the base station 40.

Moreover, in this embodiment, the allocation of the individual assistance units 71 to be created in the corresponding relation to the respective automobiles 10 is dynamically switched among the base station server apparatuses 51 in accordance with the travel of the respective automobiles 10. The individual assistance unit 71 moves among the base station server apparatuses 51 to follow the traveling automobile 10. Hence, it is possible to minimize, for example, a delay in the data transmission and reception between each of the automobiles 10 and the individual assistance unit 71, even if the base stations 40 with which the relevant one of the automobiles 10 communicates are switched.

It is possible to transmit and receive the data to be offered by each of the automobiles 10 to the corresponding individual assistance unit 71, and the data to be offered by each of the individual assistance units 71 to the corresponding automobile 10, with the delay time being stable enough to be minimized. Moreover, it is also possible to minimize their response time. It is possible for the individual assistance unit 71 to keep on offering the data available for the control, based on the data acquired from the corresponding automobile 10, not to be late for the control by the travel controller 16 of the corresponding automobile 10.

As described, in this embodiment, to assist in the travel control of the automobiles 10, the server apparatuses 50 are used. Moreover, each of the automobiles 10 includes the travel controller 16 and the vehicle communication unit 17. The travel controller 16 is configured to carry out the autonomous travel control based on the detection data by the vehicle sensors provided in each of the automobiles 10. The vehicle communication unit 17 acquires the data to be used in the travel control by the travel controller 16, from the server apparatuses 50 by the wireless communication through the base stations 40.

Moreover, in this embodiment, each of the server apparatuses 50 that assist in the travel control of the automobiles 10 includes at least one of: the individual assistance units 71; and the high-order assistance unit 73. The individual assistance units 71 are created in the corresponding relation to the respective automobiles 10. The individual assistance units 71 each offer the data available to the travel controller 16 of the corresponding automobile 10 for the travel control, to the vehicle communication unit 17 by the wireless communication through the base stations 40, to assist in the travel control of the corresponding automobile 10. The high-order assistance unit 73 generates the high-order assistance data for the travel control of each of the automobiles 10 based on the travel states of the automobiles 10, with the use of the data regarding the automobiles 10. It is to be noted that the high-order assistance unit 73 in this embodiment also has the function as the high-order collection unit, and the function as the high-order offering unit. The high-order collection unit collects the data regarding the automobiles 10 corresponding to the respective individual assistance units 71, from the respective individual assistance units 71. The high-order offering unit offers the high-order assistance data generated to be offered to each of the automobiles 10, not to each of the automobiles 10 themselves but to the individual assistance units 71 created in the corresponding relation to the respective automobiles 10.

Furthermore, the server apparatuses 50 as the entirety include all of the individual assistance units 71 and high-order assistance units 73. At this occasion, the mutual communication among the server apparatuses 50 does not include the wireless communication through the base stations 40, unlike the communication between the automobile 10 and the base station server apparatus 51. Accordingly, it is possible to perform small-delay communication basically based on wired coupling. This saves the communication among the server apparatuses 50 from fluctuation of an excessive delay that may occur in wireless communication with mobile bodies. Hence, it is possible to perform stable, small-delay communication.

In this embodiment, the individual assistance units 71 in the corresponding relation to the automobiles 10 come up in the server apparatuses 50. Each of the individual assistance units 71 creates the data available to the travel controller 16 of the corresponding automobile 10 for the travel control, based on the data acquired from the corresponding automobile 10 and the high-order assistance data offered by the high-order assistance unit 73, and transmits the generated data to the vehicle communication unit 17 of the corresponding automobile 10 by the wireless communication through the base stations 40. This makes it possible for the high-order collection unit, the high-order assistance unit 73, and the high-order offering unit to offer the high-order assistance data to be generated to be offered to each of the automobiles 10, to the individual assistance units 71 within the ranges of the server apparatuses 50, and thereby offer the high-order assistance data to the automobiles 10 for the travel control. It is possible for the high-order collection unit, the high-order assistance unit 73, and the high-order offering unit to offer the high-order assistance data to the automobiles 10 for the travel control without directly offering the high-order assistance data to the automobiles 10 by the wireless communication through the base stations 40, and end their processing. It is possible to allow the series of the processing in the server apparatuses 50 to be the stable, small-delay processing inclusive of the communication among the server apparatuses 50. Even when the automobile 10 moves, causing the switching of the base stations 40 used for the wireless communication, the series of the processing in the server apparatuses 50 is not directly affected by the switching, but becomes the stable, small-delay processing. It is possible to suppress a delay that causes a control delay.

Moreover, the automobiles 10 according to this embodiment are able to receive the data available to the travel controllers 16 of the automobiles 10 for the travel control, from the individual assistance units 71 created in the server apparatuses 50 in the corresponding relation to the respective automobiles 10, and use the data for the travel control of the vehicles. The travel controller 16 of each of the automobiles 10 is able to receive the data based on the high-order assistance data and use the data for the travel control of the vehicle without, for example, generating the high-order assistance data offered by the high-order assistance unit 73 as described above by its own processing. It is possible to reduce the processing load on each of the automobiles 10. Even when each of the automobiles 10 carries out the travel control corresponding to the high-level automated driving, it is possible to acquire the high-order assistance data generated by the server apparatuses 50 and the data based on the high-order assistance data, from the server apparatuses 50, and carry out the travel control by small-load processing. It is possible to suppress the performance desired for the automobile 10.

As described, in this embodiment, it is possible to solve the problems in allowing the server apparatuses to assist in the travel control of the automobiles 10 while keeping the overall balance, and to suitably allow the server apparatuses 50 to assist in the travel control of the automobiles 10.

Second Embodiment

Next, the travel control assistance system 1 for the automobile 10 according to a second embodiment of the invention is described. The configuration and the control of the travel control assistance system 1 in this embodiment are similar to those of the forgoing embodiment, and denoted by the same reference characters, with the description thereof omitted. Hereinafter, description is given mainly of differences from the forgoing embodiment.

FIG. 10 is a flowchart of an individual assistance control for the corresponding automobile 10, by the individual assistance unit 71 in the second embodiment of the invention.

The individual assistance unit 71 repeatedly carries out the individual assistance control in FIG. 10 to repeatedly acquire the detection data from the corresponding automobile 10 and continuously assist in the travel control of the corresponding automobile 10.

In FIG. 10, the processes of steps ST11 to ST17 are similar to those in FIG. 7. However, after step ST15, the individual assistance unit 71 causes the flow to proceed to step ST40.

In step ST40, the individual assistance unit 71 generates course data to be actually transmitted to the automobile 10 based on the detection data (including the secondary detection data) by the vehicle sensors of the corresponding automobile 10 acquired up to step ST14 and the high-order assistance data acquired in step ST15 from the high-order assistance unit 73. Here, the course data may be transmitted to the automobile 10 in replacement of the high-order assistance data. Thereafter, the individual assistance unit 71 causes the flow to proceed to step ST17.

FIG. 11 is a detailed flowchart of generation processing of the course data in FIG. 7.

The individual assistance unit 71 carries out the generation processing of the course data in FIG. 11, in step ST40 in FIG. 10.

In step ST41, the individual assistance unit 71 provisionally generates a travel course following the high-order assistance data acquired from the high-order assistance unit 73.

For example, when the high-order assistance data is the traffic control data regarding the travelable range or the travel-restricted range, the individual assistance unit 71 provisionally generates the travel course limited by the range.

In addition, for example, when the high-order assistance data is the control value of the remote control that is available to the travel controller 16 of the automobile 10 for the travel control, the individual assistance unit 71 provisionally generates the travel course based on the control value.

In step ST42, the individual assistance unit 71 compares the provisionally generated travel course with the detection data by the vehicle sensors of the automobile 10, and determines whether or not the provisionally generated travel course interferes with the travel route or the surrounding objects. As the detection data by the vehicle sensors to be compared here, the recognition data regarding the travel route and the recognition data regarding the surrounding objects generated by the individual assistance unit 71 based on the detection data by the vehicle sensors may be used. When the provisionally generated travel course does not interfere with the travel route or the surrounding objects, the individual assistance unit 71 causes the flow to proceed to step ST43. When the provisionally generated travel course interferes with the travel route or the surrounding objects, the individual assistance unit 71 causes the flow to proceed to step ST44.

In step ST43, the individual assistance unit 71 decides the provisionally generated travel course as the course to be offered to the corresponding automobile 10. Thereafter, the individual assistance unit 71 causes the flow to return to FIG. 10, and in step ST16, transmits and offers the provisionally generated travel course to the corresponding automobile 10.

In step ST44, the individual assistance unit 71 generates the travel course in which the provisionally generated travel course following the high-order assistance data is adjusted to inhibit interference. The individual assistance unit 71 decides the travel course changed by the adjustment as the course to be offered to the corresponding automobile 10. Thereafter, the individual assistance unit 71 causes the flow to return to FIG. 10, and in step ST16, transmits and offers the adjusted travel course to the corresponding automobile 10.

As described, the individual assistance unit 71 does not transmit and offer the high-order assistance data acquired from the high-order assistance unit 73 to the corresponding automobile 10, but transmits and offers the travel course generated based on the high-order assistance data to the corresponding automobile 10. The individual assistance unit 71 is able to offer the data regarding the travel course in accordance with the actual travel situation of the corresponding automobile 10 to the corresponding automobile 10.

It is to be noted that in step ST42, the individual assistance unit 71 not only may determine the interference by the comparison with the detection data by the corresponding automobile 10, but also may make a determination based on other comparisons as well.

Examples of such a determination based on other comparisons include a comparison between the travel route map based on the high-precision map data 67 and the travel course. The travel route map is held in the server memory 63 of the base station server apparatus 51 in which the individual assistance unit 71 comes up. Moreover, when the provisionally generated travel course is not consistent with the travel route map based on the high-precision map data 67 in the base station server apparatus 51, the individual assistance unit 71 may cause the flow to proceed to step ST44. In this case, in step ST44, the individual assistance unit 71 may adjust the provisionally generated travel course to make the provisionally generated travel course consistent with the travel route map based on the high-precision map data 67 in the base station server apparatus 51.

In addition, for example, in the server memory 63 of the base station server apparatus 51 in which the individual assistance unit 71 comes up, the characteristic data regarding, for example, the driver's inter-vehicle distance may be held. In this case, in step ST41, the individual assistance unit 71 may adjust the provisionally generated travel course in accordance with the characteristics such as the driver's inter-vehicle distance. For example, the individual assistance unit 71 may assume the inter-vehicle distance that makes it possible to ensure the safety of each of the automobiles 10 to be the minimum. Moreover, the individual assistance unit 71 may generate the travel course at the distance obtained by adding or subtracting the distance corresponding to the deviation of the inter-vehicle distance with respect to the driver to or from the minimum.

The base station server apparatus 51 in which the individual assistance unit 71 comes up may independently carry out the locally closed traffic/remote control separately from the higher-order server apparatus in which the high-order assistance unit 73 comes up.

As described, in this embodiment, the individual assistance units 71 included in the base station server apparatuses 51 in the corresponding relation to the automobiles 10 each acquire the detection data by the vehicle sensors from the corresponding automobile 10, and acquire the high-order assistance data in accordance with the travel environment of the corresponding automobile 10 from the high-order assistance unit 73. Moreover, when the travel controller 16 of the corresponding automobile 10 allows the travel following the high-order assistance data, without the interference with the travel route or the surrounding objects recognizable based on the detection data (including the secondary detection data) by the vehicle sensors, the individual assistance units 71 each generate the data following the high-order assistance data, as the data available to the travel controller 16 of the corresponding automobile 10 for the travel control. In contrast, when the travel controller 16 of the corresponding automobile 10 allows the travel following the high-order assistance data, with the interference with the travel route or the surrounding objects recognizable based on the detection data by the vehicle sensors, the individual assistance units 71 each generate the data in which the trave following the high-order assistance data is adjusted and changed to inhibit the interference, as the data available to the travel controller 16 of the corresponding automobile 10 for the travel control.

Thus, even when the individual assistance units 71 corresponding to the respective automobiles 10 each acquire the high-order assistance data that does not sufficiently correspond to the reality from the high-order assistance unit 73, the individual assistance units 71 corresponding to the respective automobiles 10 are each able to generate the course data sufficiently corresponding to the reality detected by the vehicle sensors of each of the automobiles 10, and offer the course data to the corresponding automobile 10. The individual assistance unit 71 carries out such adjustment processing on the lower-order side, making it possible for the high-order assistance unit 73 to generate the high-order assistance data that makes it possible for the automobiles 10 to basically continue the travel safely, even when the high-order assistance unit 73 does not obtain all the data regarding the actual travel environment of the automobiles 10.

Although the forgoing embodiments are preferred embodiments of the invention, the invention is by no means limited thereto. It should be appreciated that various modifications and alterations may be made by persons skilled in the art without departing from the scope as defined by the appended claims.

In the forgoing embodiments, the high-order assistance unit 73 determines the travel environment of the automobiles 10 and generates the high-order assistance data for each of the automobiles 10. Basically, the high-order assistance unit 73 comes up in the narrow-area server apparatuses 52 or the wide-area server apparatus 53, or the high-order server apparatus 55 in FIG. 3.

In addition, for example, the high-order assistance unit 73 may come up in some of the base station server apparatuses 51.

The arrangement of the individual assistance units 71 and the high-order assistance unit 73 in the server apparatuses 50 is not limited to that illustrated in FIG. 3. For example, the high-order assistance unit 73 may be arranged in the single base station server apparatus 51 together with the individual assistance unit 71.

Moreover, the travel control assistance system 1 to which the invention is applicable is not limited to the configuration of the server apparatuses 50 in FIG. 3. The configuration of the server apparatuses 50 may be designed in accordance with various kinds of installation environment such as geographic features, arrangement of the cities, distribution of population density, and the presence or absence of expressways in the area to be managed by the travel control assistance system 1.

DESCRIPTION OF REFERENCE NUMERALS

1: Travel control assistance system
10: Automobile (vehicle)
11: Driving controller
12: Steering controller
13: Braking controller
14: Driving operation controller
15: Vehicle sensor unit
16: Travel controller
17: Vehicle communication unit
18: Central gateway apparatus
19: Cable
21: Acceleration rate sensor
22: Corner radar
23: Stereo camera
24: Lidar
25: Omnidirectional camera
26: GNSS receiver
31: Vehicle memory
32: Vehicle ECU 33: Vehicle high-precision map data
40: Base station
41 and 60: Server apparatus
42: Carrier communication cable
43: Local system
44: Other server apparatuses
45: Wide-area communication network
46: Gateway apparatus
50: Server apparatuses
51: Base station server apparatus
52: Narrow-area server apparatus
53: Wide-area server apparatus
54: Acceleration server apparatus
55: High-order server apparatus
57: Carrier wide-area communication network
61: Server communication unit
62: Server GNSS receiver
63: Server memory
64: Server CPU
65: Server bus
67: Service-area high-precision map data
68: Other server apparatuses
71: Individual assistance unit
72: Remote detection unit
73: High-order assistance unit (high-order collection unit, high-order offering unit)
110: GNSS satellites

The invention claimed is:

1. A vehicle travel control assistance system in which vehicles and server apparatuses establish wireless communication through base stations to allow the server apparatuses to assist in a travel control of the vehicles,
each of the vehicles comprising an electrical control unit configured to:
carry out the travel control based on detection data by a vehicle sensor provided in each of the vehicles; and
acquire data to be used in the travel control from the server apparatuses by the wireless communication through the base stations,
the server apparatuses as an entirety comprising:
individual assistance units to be created in corresponding relation to the respective vehicles, each of the individual assistance units being configured to offer data available to the electrical control unit of a corresponding one of the vehicles for the travel control, by the wireless communication through the base stations, to assist in the travel control of the corresponding one of the vehicles;
a high-order collection unit configured to collect data regarding the vehicles to which the respective individual assistance units correspond, from the respective individual assistance units;
a high-order assistance unit configured to generate high-order assistance data for the travel control of each of the vehicles based on travel states of the vehicles, with use of the data regarding the vehicles collected by the high-order collection unit; and
a high-order offering unit configured to offer the high-order assistance data generated to be offered to each of the vehicles by the high-order assistance unit, to the individual assistance units created in the corresponding relation to the respective vehicles,
wherein each of the individual assistance units to be created in the corresponding relation to the respective vehicles is configured to generate the data available to the electrical control unit of the corresponding one of the vehicles for the travel control, based on the data acquired from the corresponding one of the vehicles and the high-order assistance data offered by the high-order offering unit, and transmit the generated data to the corresponding one of the vehicles, and
wherein the electrical control unit in each vehicle is further configured to output a control value based on the detection data and the data acquired from a corresponding one of the individual assistance units, to at least one of a driving controller, a steering controller, and a braking controller to control motion of that vehicle, and
wherein each of the individual assistance units provided in the server apparatuses in the corresponding relation to the vehicles is configured to:
acquire the detection data by the vehicle sensor from the corresponding one of the vehicles;
acquire the high-order assistance data in accordance with travel environment of the corresponding one of the vehicles, from the high-order assistance unit;
generate data following the high-order assistance data, as the data available to the electrical control unit of the corresponding one of the vehicles for the travel control, when the electrical control unit of the corresponding one of the vehicles allows travel following the high-order assistance data, without interference with a travel route or a surrounding object recognizable based on the detection data by the vehicle sensor; and
generate data in which the travel following the high-order assistance data is changed to inhibit the interference, as the data available to the electrical control unit of the corresponding one of the vehicles for the travel control, when the electrical control unit of the corresponding one of the vehicles allows the travel following the high-order assistance data, with the interference with the travel route or the surrounding object recognizable based on the detection data by the vehicle sensor.

2. The vehicle travel control assistance system according to claim 1, wherein
each of the individual assistance units provided in the server apparatuses in the corresponding relation to the vehicles is configured to
acquire the detection data by the vehicle sensor from the corresponding one of the vehicles through the wireless communication through the base stations,
process the acquired detection data by the vehicle sensor to generate secondary detection data, and
transmit the generated secondary detection data to the corresponding one of the vehicles, and
the electrical control unit of the corresponding one of the vehicles is configured to carry out the travel control with use of the secondary detection data and the detection data by the vehicle sensor provided in each of the vehicles.

3. The vehicle travel control assistance system according to claim 2, wherein
each of the individual assistance units is configured to
acquire the detection data by the vehicle sensor from the corresponding one of the vehicles, the detection data including space data obtained by detecting surroundings of the vehicle by the vehicle sensor,
process the acquired space data regarding the surroundings to generate recognition data regarding a travel route around the vehicle or recognition data regarding a surrounding object around the vehicle, as the secondary detection data, and transmit the generated secondary detection data regarding the recognition data regarding the travel route around the vehicle or the recognition data regarding the surrounding object around the vehicle, to the corresponding one of the vehicles.

4. The vehicle travel control assistance system according to claim 2, wherein
the high-order collection unit provided in one of the server apparatuses is configured to collect data regarding at least positions of the vehicles to which the respective individual assistance units correspond, from the respective individual assistance units, and
the high-order assistance unit is configured to
map the positions of the vehicles collected by the high-order collection unit, onto a travel route map based on high-precision map data, and
generate the high-order assistance data based on a travel state on the travel route map onto which the vehicles are mapped, the high-order assistance data being available to the electrical control unit of each of the vehicles for the travel control in accordance with travel environment of a relevant one of the vehicles.

5. The vehicle travel control assistance system according to claim 2, wherein
for communication among the server apparatuses, a virtual private network by mutual authentication of a communication initiator and a communication target is used, and
for communication through the base stations between each of the vehicles that move by traveling and the server apparatus including the individual assistance unit in the corresponding relation to a relevant one of the vehicles, a virtual private network by authentication of the server apparatus is used.

6. The vehicle travel control assistance system according to claim 2, wherein
the server apparatuses include area server apparatuses provided for respective areas in each of which one or more of the base stations are provided,
each of the individual assistance units to be created in the corresponding relation to the respective vehicles is provided in a respective area server apparatus corresponding to the base station, and
allocation of the individual assistance units is dynamically switched among the area server apparatuses in accordance with the travel of the respective vehicles.

7. The vehicle travel control assistance system according to claim 1, wherein
the high-order collection unit provided in one of the server apparatuses is configured to collect data regarding at least positions of the vehicles to which the respective individual assistance units correspond, from the respective individual assistance units, and
the high-order assistance unit is configured to
map the positions of the vehicles collected by the high-order collection unit, onto a travel route map based on high-precision map data, and
generate the high-order assistance data based on a travel state on the travel route map onto which the vehicles are mapped, the high-order assistance data being available to the electrical control unit of each of the vehicles for the travel control in accordance with travel environment of a relevant one of the vehicles.

8. The vehicle travel control assistance system according to claim 1, wherein
for communication among the server apparatuses, a virtual private network by mutual authentication of a communication initiator and a communication target is used, and
for communication through the base stations between each of the vehicles that move by traveling and the server apparatus including the individual assistance unit in the corresponding relation to a relevant one of the vehicles, a virtual private network by authentication of the server apparatus is used.

9. The vehicle travel control assistance system according to claim 1, wherein
the server apparatuses include area server apparatuses provided for respective areas in each of which one or more of the base stations are provided,
each of the individual assistance units to be created in the corresponding relation to the respective vehicles is provided in a respective area server apparatus corresponding to the base station, and
allocation of the individual assistance units is dynamically switched among the area server apparatuses in accordance with the travel of the respective vehicles.

10. A server apparatus to be used in a vehicle travel control assistance system in which vehicles and server apparatuses establish wireless communication through base stations to allow the server apparatuses to assist in a travel control of the vehicles,
each of the vehicles comprising an electrical control unit configured to
carry out the travel control based on detection data by a vehicle sensor provided in each of the vehicles; and
acquire data to be used in the travel control by the electrical control unit, from the server apparatuses by the wireless communication through the base stations,
the server apparatus comprising:
a server communication unit configured to establish communication with one of the server apparatuses other than the server apparatus by wired coupling without the wireless communication through the base stations; and
a server controller configured to carry out a control of allowing the server apparatuses to assist in the travel control of the vehicles, wherein
the server controller is configured to carry out a control with respect to at least one of individual assistance units or at least a high-order assistance unit out of:
the individual assistance units to be created in corresponding relation to the respective vehicles, each of the individual assistance units being configured to offer data available to the electrical control unit of a corresponding one of the vehicles for the travel control, by the wireless communication through the base stations, to assist in the travel control of the corresponding one of the vehicles;
a high-order collection unit configured to collect data regarding the vehicles to which the respective individual assistance units correspond, from the respective individual assistance units;
a high-order assistance unit configured to generate high-order assistance data for the travel control of each of the vehicles based on travel states of the vehicles, with use of the data regarding the vehicles collected by the high-order collection unit; and
a high-order offering unit configured to offer the high-order assistance data generated to be offered to each of the vehicles by the high-order assistance unit, to the individual assistance units created in the corresponding relation to the respective vehicles, and wherein the electrical control unit in each vehicle is further configured to output a control value based on the detection data and the data acquired from a corresponding one of the individual assistance units, to at least one of a driving controller, a steering controller, and a braking controller to control motion of that vehicle, and wherein each of the individual assistance units provided in the server apparatuses in the corresponding relation to the vehicles is configured to:
acquire the detection data by the vehicle sensor from the corresponding one of the vehicles;
acquire the high-order assistance data in accordance with travel environment of the corresponding one of the vehicles, from the high-order assistance unit;
generate data following the high-order assistance data, as the data available to the electrical control unit of the corresponding one of the vehicles for the travel control, when the electrical control unit of the corresponding one of the vehicles allows travel following the high-order assistance data, without interference with a travel route or a surrounding object recognizable based on the detection data by the vehicle sensor; and
generate data in which the travel following the high-order assistance data is changed to inhibit the interference, as the data available to the electrical control unit of the corresponding one of the vehicles for the travel control, when the electrical control unit of the corresponding one of the vehicles allows the travel following the high-order assistance data, with the interference with the travel route or the surrounding object recognizable based on the detection data by the vehicle sensor.

11. A vehicle configured to be assisted in the travel control of the vehicle by the server apparatus according to claim 10, with vehicles including the vehicle and the server apparatus of the vehicle travel control assistance system establishing wireless communication through base stations, the vehicle comprising:
the vehicle sensor; and
the electrical control unit configured to carry out the travel control based on detection data by the vehicle sensor, and acquire data to be used in the travel control by the electrical control unit, from the server apparatus by the wireless communication through the base stations,
wherein the detection data by the vehicle sensor is transmitted to the server apparatus in which an individual assistance unit corresponding to the vehicle is created, and
wherein secondary detection data generated by the individual assistance unit by processing the detection data by the vehicle sensor is received from the server apparatus in which the individual assistance unit corresponding to the vehicle comes up, and
wherein the electrical control unit is configured to output the control value based on the secondary detection data from the individual assistance unit, and the detection data by the vehicle sensor, to at least one of the driving controller, the steering controller, and the braking controller to control motion of the vehicle.

\* \* \* \* \*